US008029009B2

(12) United States Patent
Teal et al.

(10) Patent No.: US 8,029,009 B2
(45) Date of Patent: *Oct. 4, 2011

(54) SELF-PROPELLED VEHICLE PROPELLED BY AN ELLIPTICAL DRIVE TRAIN INCLUDING FOOT LINK GUIDE TRACK

(75) Inventors: Brent C. Teal, Solana Beach, CA (US); Bryan L. Pate, Atherton, CA (US)

(73) Assignee: PT Motion Works, Inc., Solana Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/777,990

(22) Filed: May 11, 2010

(65) Prior Publication Data

US 2010/0219601 A1 Sep. 2, 2010

Related U.S. Application Data

(63) Continuation of application No. 11/899,100, filed on Sep. 4, 2007, now Pat. No. 7,717,446.

(60) Provisional application No. 60/860,570, filed on Nov. 21, 2006.

(51) Int. Cl.
*B62M 1/00* (2010.01)
(52) U.S. Cl. ........................ 280/221; 280/232
(58) Field of Classification Search .................. 280/221, 280/232, 252
See application file for complete search history.

(56) References Cited

U.S. PATENT DOCUMENTS

| 1,190,089 A | 7/1916 | Bellairs |
| 1,601,249 A | 9/1926 | Hayden |
| 1,617,357 A | 2/1927 | Walter |
| 1,750,187 A | 3/1930 | Miller et al. |
| 2,424,639 A | 7/1947 | Sobiral |
| 2,466,105 A * | 4/1949 | Hoffman ...................... 280/221 |
| 2,723,131 A | 11/1955 | McChesney, Jr. |
| 4,026,571 A | 5/1977 | Vereyken |
| 4,077,648 A | 3/1978 | Seul |
| 4,193,324 A | 3/1980 | Marc |
| 4,379,566 A | 4/1983 | Titcomb |
| 4,456,276 A | 6/1984 | Bortolin |
| 4,577,879 A | 3/1986 | Vereyken |
| 4,666,173 A | 5/1987 | Graham |
| 4,761,014 A | 8/1988 | Huang |
| 4,850,245 A | 7/1989 | Feamster et al. |
| 4,973,046 A | 11/1990 | Maxwell |

(Continued)

FOREIGN PATENT DOCUMENTS

CA 2434373 8/1996

(Continued)

*Primary Examiner* — Paul N Dickson
*Assistant Examiner* — Tashiana Adams
(74) *Attorney, Agent, or Firm* — Stephen C. Beuerle; Procopio Cory Hargreaves & Savitch LLP

(57) ABSTRACT

An apparatus including a frame; a drive wheel coupled to the frame; a first and a second foot link, operably coupled to drive wheel to transfer power to said drive wheel so as to propel the apparatus, each including a foot receiving portion for receiving an operator's foot, a front end, and a rear end; and a first and a second foot link guide track, each foot link guide track operatively associated with the front end of the foot link to direct the front end along a reciprocating path of travel while providing retention to the foot link.

30 Claims, 26 Drawing Sheets

U.S. PATENT DOCUMENTS

| | | | |
|---|---|---|---|
| 5,110,148 A | 5/1992 | Stienbarger | |
| 5,161,430 A | 11/1992 | Febey | |
| 5,192,089 A | 3/1993 | Taylor | |
| 5,224,724 A | 7/1993 | Greenwood | |
| 5,261,294 A | 11/1993 | Ticer et al. | |
| 5,352,169 A * | 10/1994 | Eschenbach | 482/57 |
| 5,368,321 A | 11/1994 | Berman et al. | |
| 5,383,829 A | 1/1995 | Miller | |
| 5,419,572 A | 5/1995 | Stiller et al. | |
| 5,433,680 A | 7/1995 | Knudsen | |
| 5,458,022 A | 10/1995 | Mattfeld | |
| 5,527,246 A | 6/1996 | Rodgers, Jr. | |
| 5,566,589 A | 10/1996 | Buck | |
| 5,566,590 A | 10/1996 | Wan | |
| 5,591,107 A | 1/1997 | Rodgers, Jr. | |
| 5,611,757 A | 3/1997 | Rodgers, Jr. | |
| 5,879,017 A | 3/1999 | Debruin | |
| 5,893,820 A * | 4/1999 | Maresh et al. | 482/51 |
| 6,024,676 A | 2/2000 | Eschenbach | |
| 6,077,198 A * | 6/2000 | Eschenbach | 482/52 |
| 6,146,313 A | 11/2000 | Whan-Tong et al. | |
| 6,270,102 B1 | 8/2001 | Fan | |
| 6,398,244 B1 | 6/2002 | Chueh | |
| 6,398,695 B2 * | 6/2002 | Miller | 482/52 |
| 6,439,590 B1 | 8/2002 | Liang | |
| 6,474,193 B1 | 11/2002 | Farney | |
| 6,485,041 B1 | 11/2002 | Janssen | |
| 6,572,128 B2 | 6/2003 | Graf | |
| 6,589,139 B1 | 7/2003 | Butterworth | |
| 6,640,662 B1 | 11/2003 | Baxter | |
| 6,648,353 B1 | 11/2003 | Cabal | |
| 6,648,355 B2 | 11/2003 | Ridenhour | |
| 6,659,486 B2 * | 12/2003 | Eschenbach | 280/221 |
| 6,663,127 B2 | 12/2003 | Miller | |
| 6,688,624 B2 | 2/2004 | Christensen et al. | |
| 6,689,019 B2 | 2/2004 | Ohrt et al. | |
| 6,715,779 B2 | 4/2004 | Eschenbach | |
| 6,726,600 B2 * | 4/2004 | Miller | 482/51 |
| 6,773,022 B2 | 8/2004 | Janssen | |
| 6,802,798 B1 | 10/2004 | Zeng | |
| 6,840,524 B2 | 1/2005 | Yu | |
| 6,857,648 B2 | 2/2005 | Mehmet | |
| 6,895,834 B1 | 5/2005 | Baatz | |
| D526,250 S | 8/2006 | Trumble et al. | |
| 7,121,572 B1 | 10/2006 | Jaffe et al. | |
| 7,140,626 B1 | 11/2006 | Keay | |
| 7,244,217 B2 * | 7/2007 | Rodgers, Jr. | 482/52 |
| 7,448,986 B1 * | 11/2008 | Porth | 482/52 |
| 7,686,114 B2 * | 3/2010 | Kim | 180/205 |
| 7,717,446 B2 | 5/2010 | Pate | |
| 2002/0105160 A1 | 8/2002 | Yen | |
| 2002/0151412 A1 * | 10/2002 | Lee | 482/52 |
| 2003/0025293 A1 * | 2/2003 | Drew | 280/253 |
| 2003/0193158 A1 * | 10/2003 | Hung | 280/221 |
| 2004/0077463 A1 | 4/2004 | Rodgers | |
| 2005/0248117 A1 * | 11/2005 | Hung | 280/221 |
| 2007/0024019 A1 * | 2/2007 | Tarlow et al. | 280/221 |
| 2007/0114749 A1 * | 5/2007 | Tal | 280/221 |
| 2007/0235974 A1 | 10/2007 | Vargas | |
| 2009/0315294 A1 | 12/2009 | Conti | |

FOREIGN PATENT DOCUMENTS

| | | |
|---|---|---|
| CA | 2670278 A1 | 11/2007 |
| KR | 20-0418734 Y1 | 6/2006 |
| KR | 10-2009-0043621 A | 5/2009 |
| WO | 03022670 | 3/2003 |

* cited by examiner

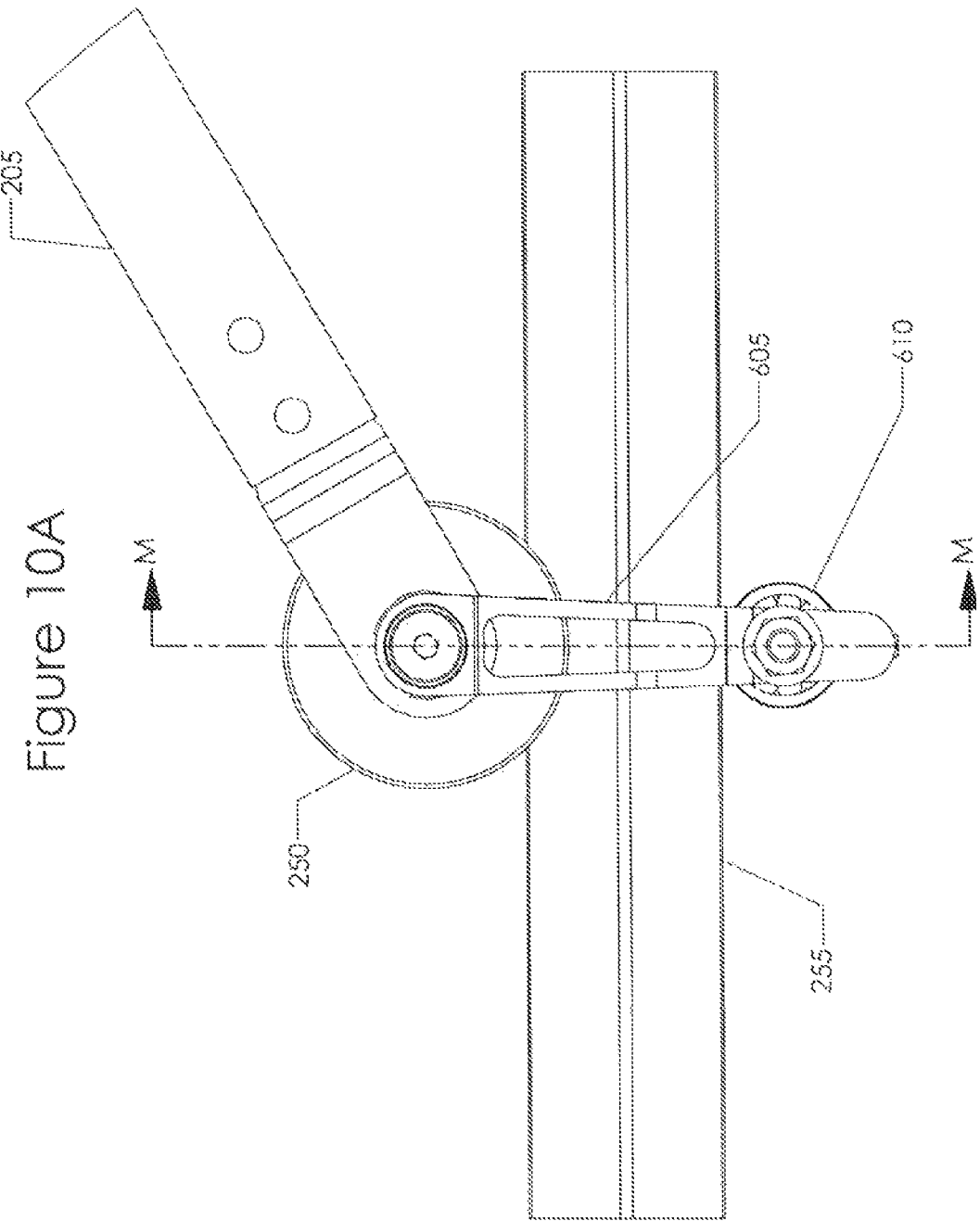

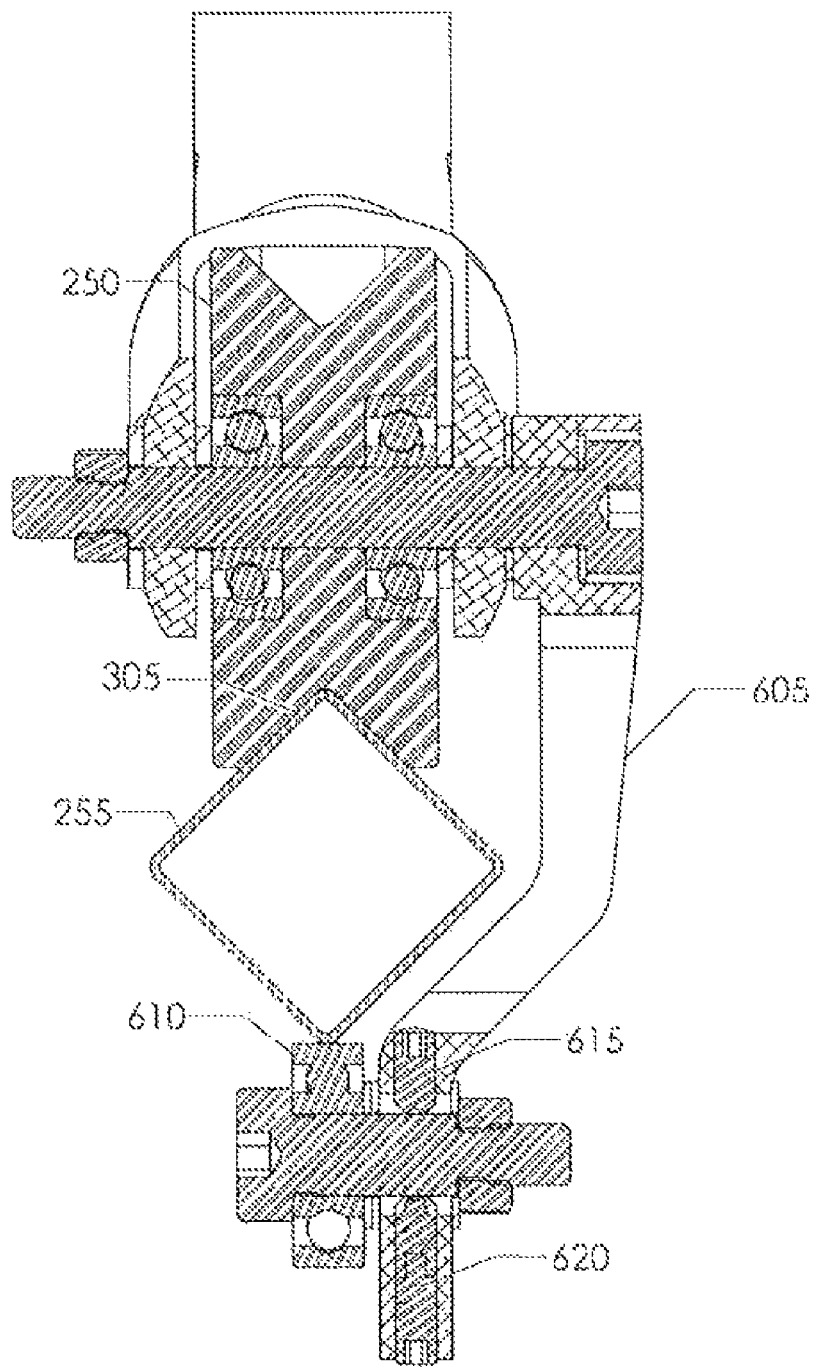

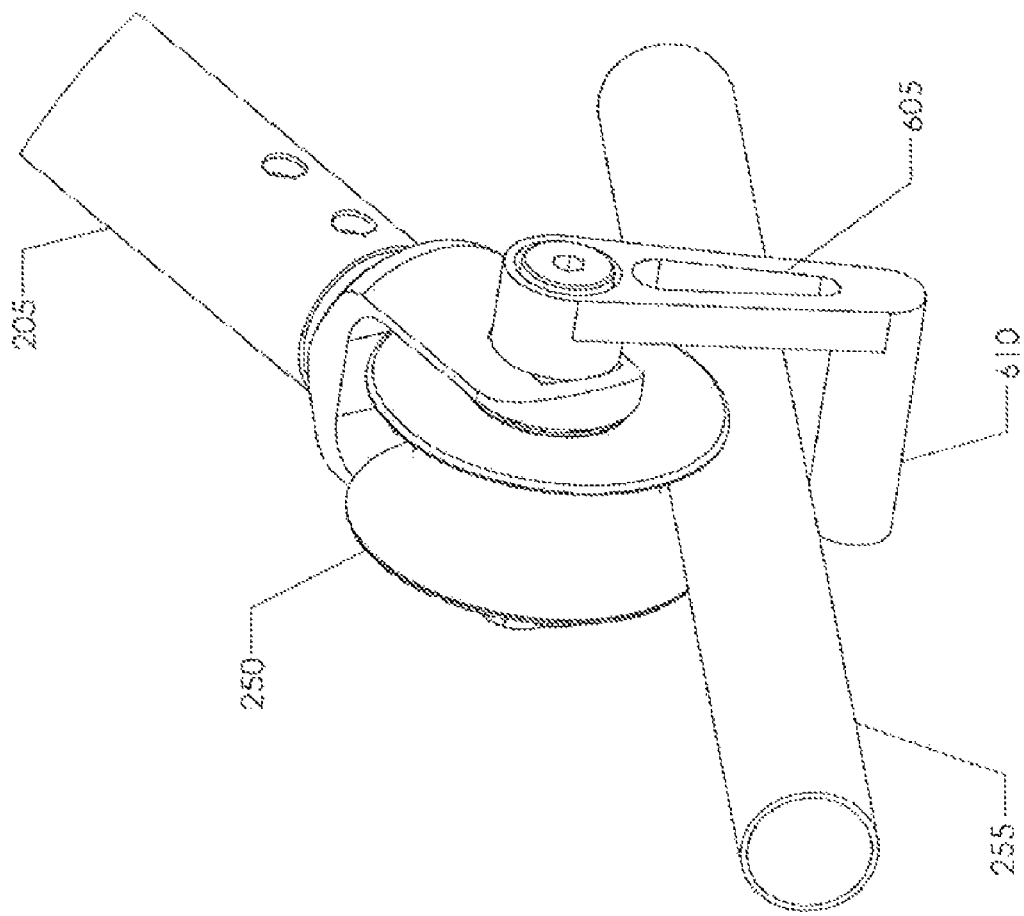

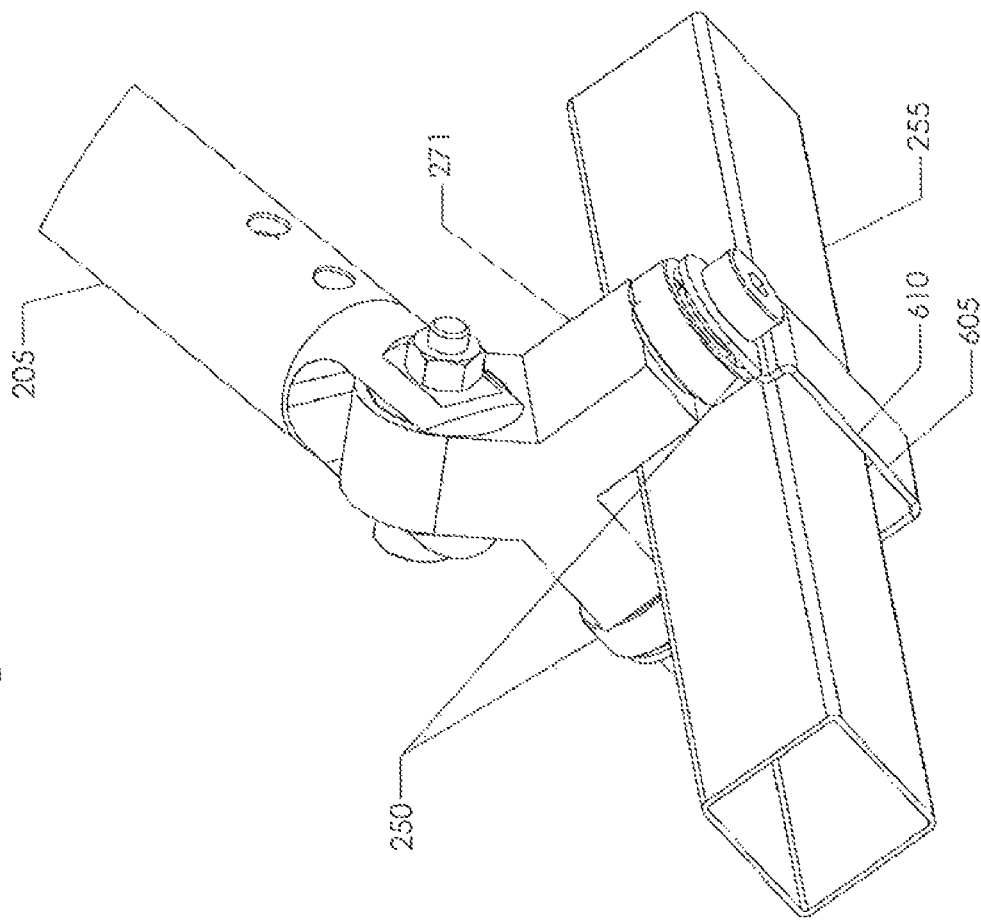

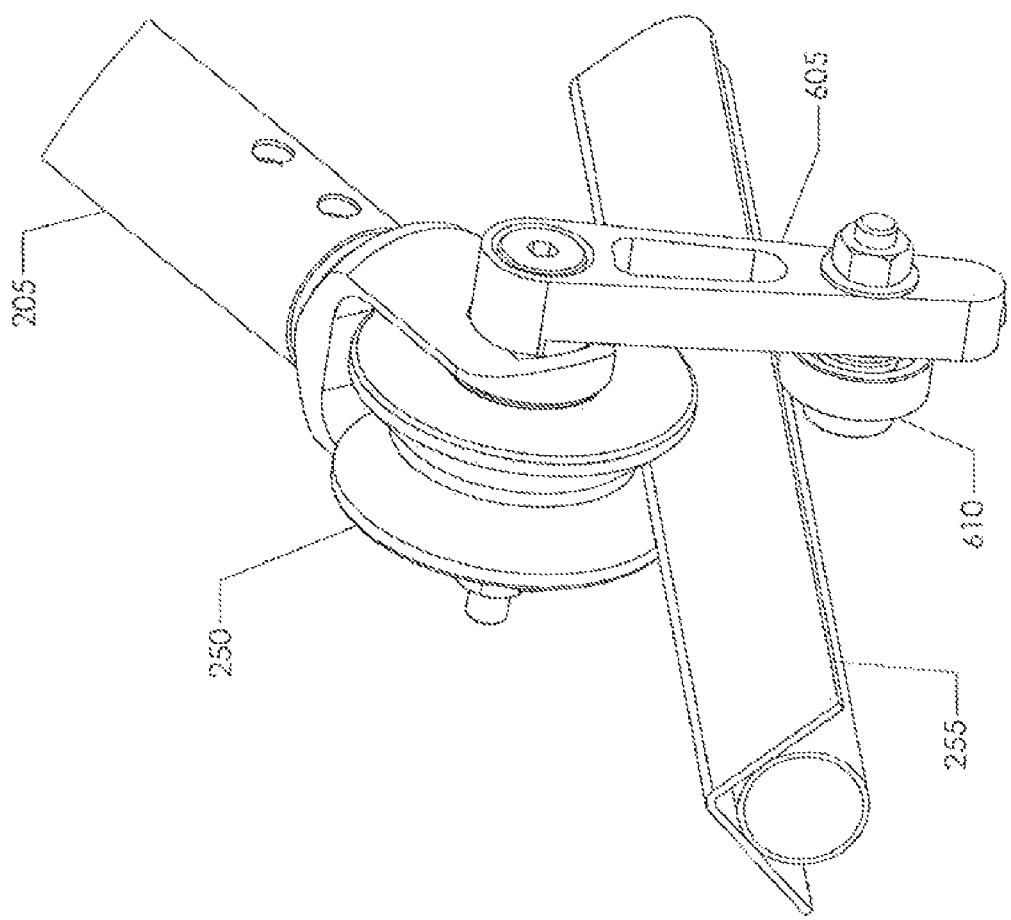

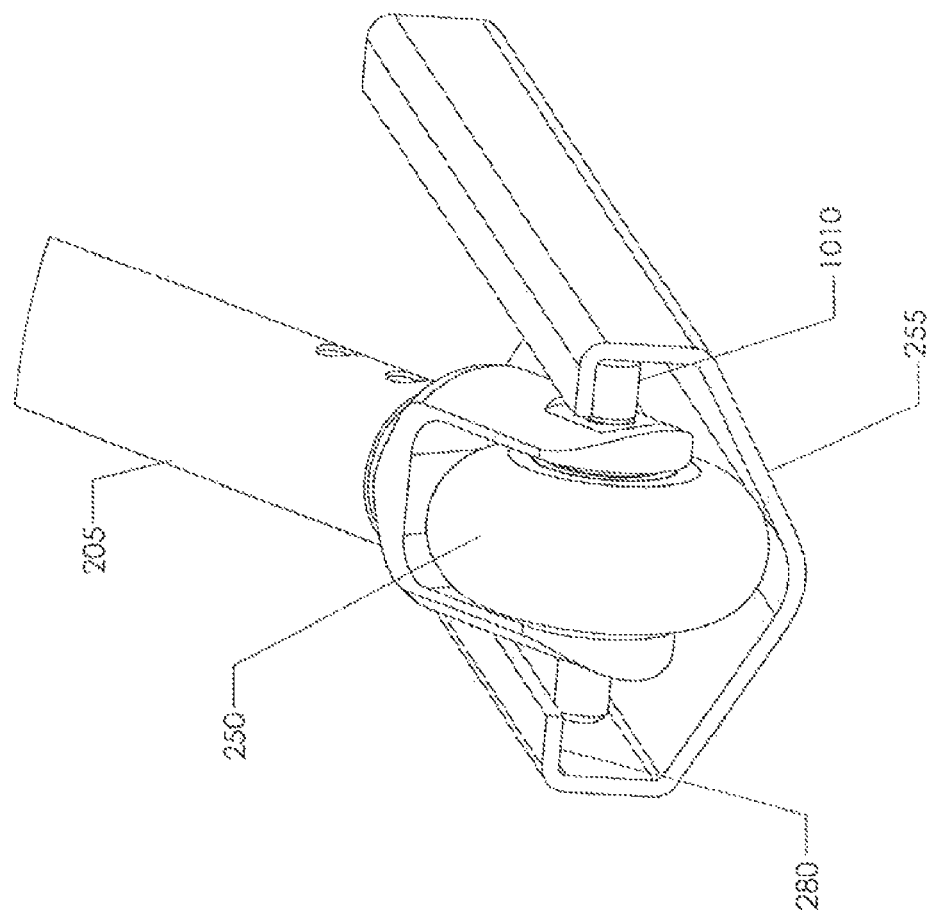

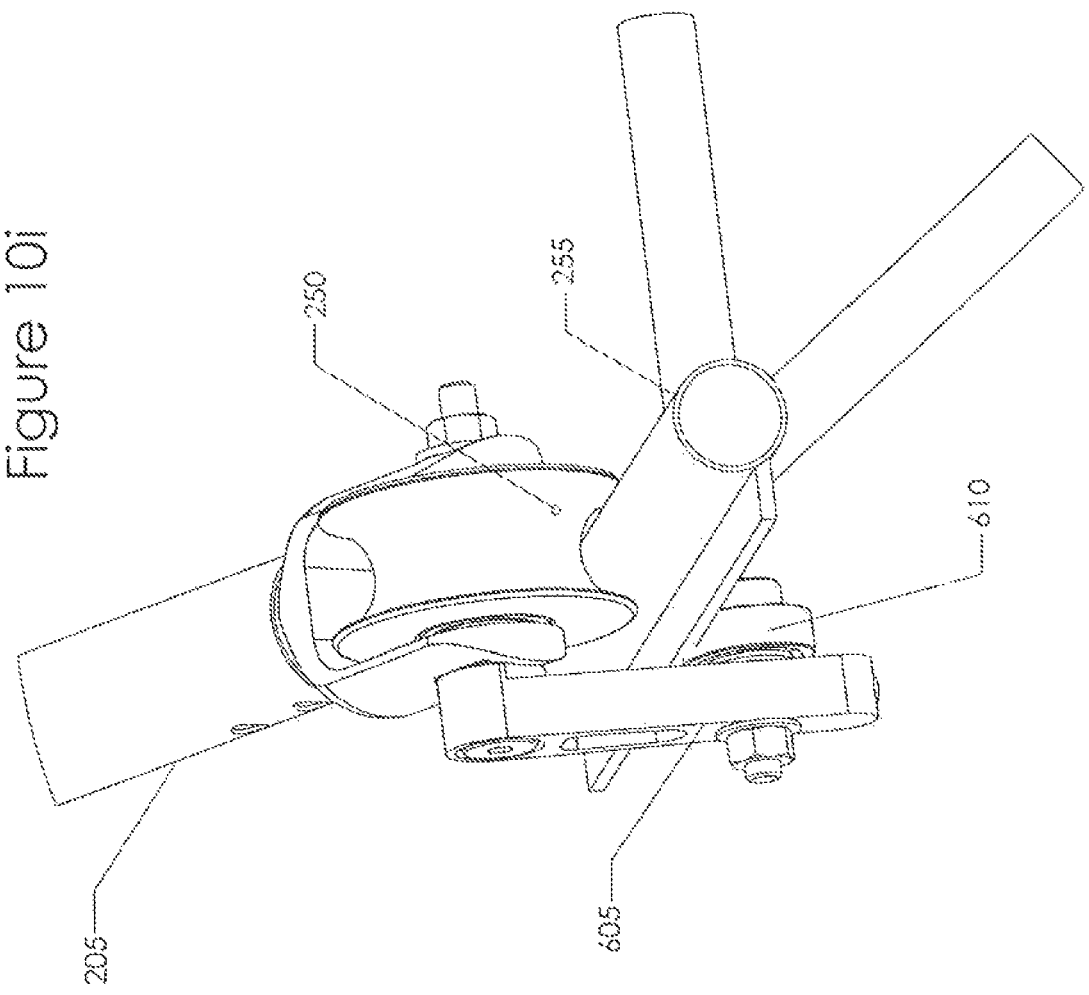

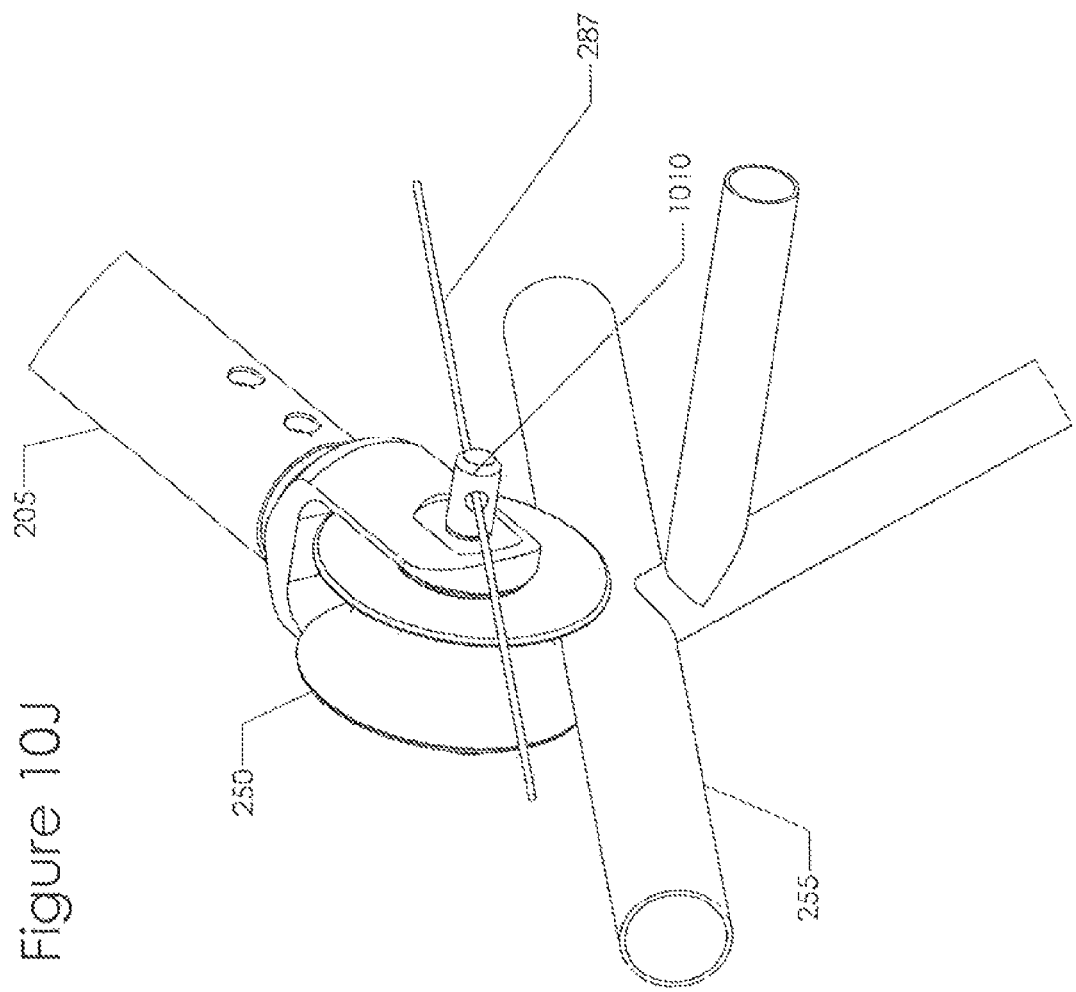

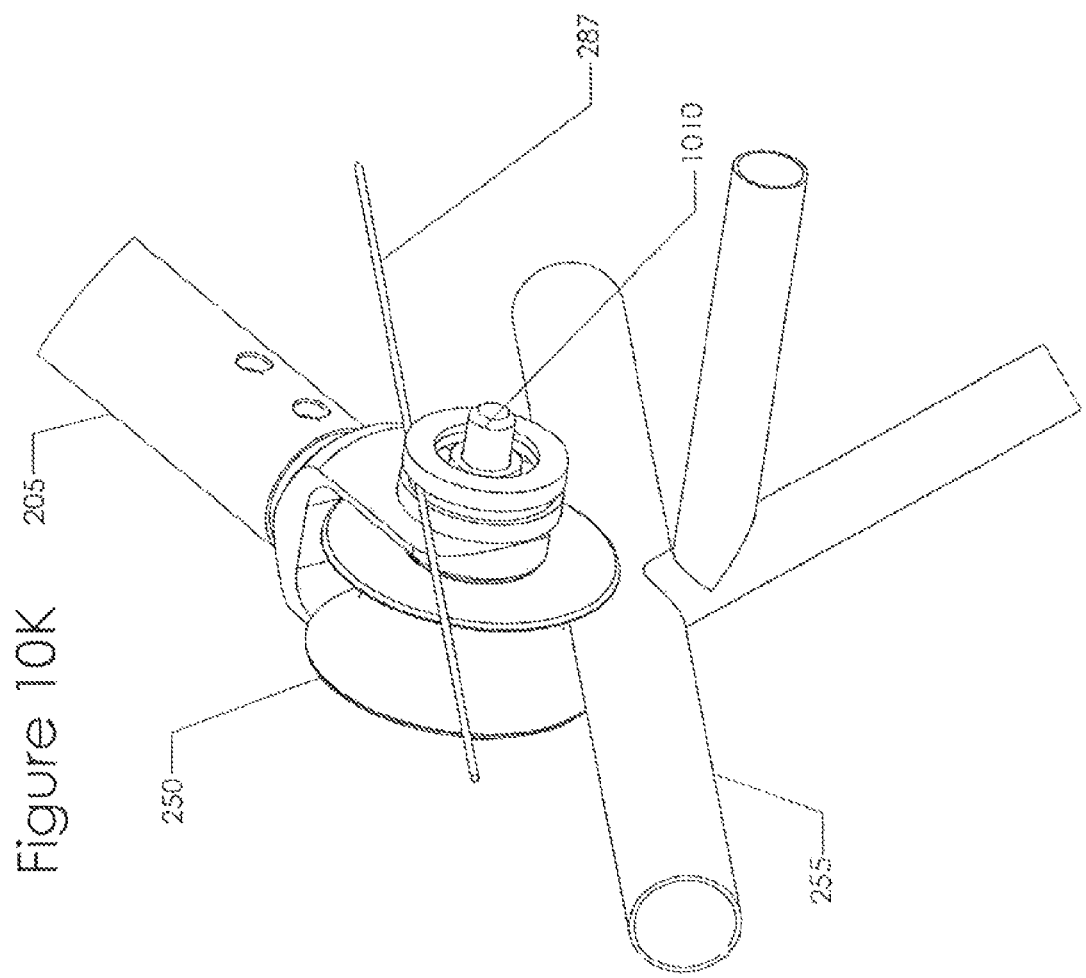

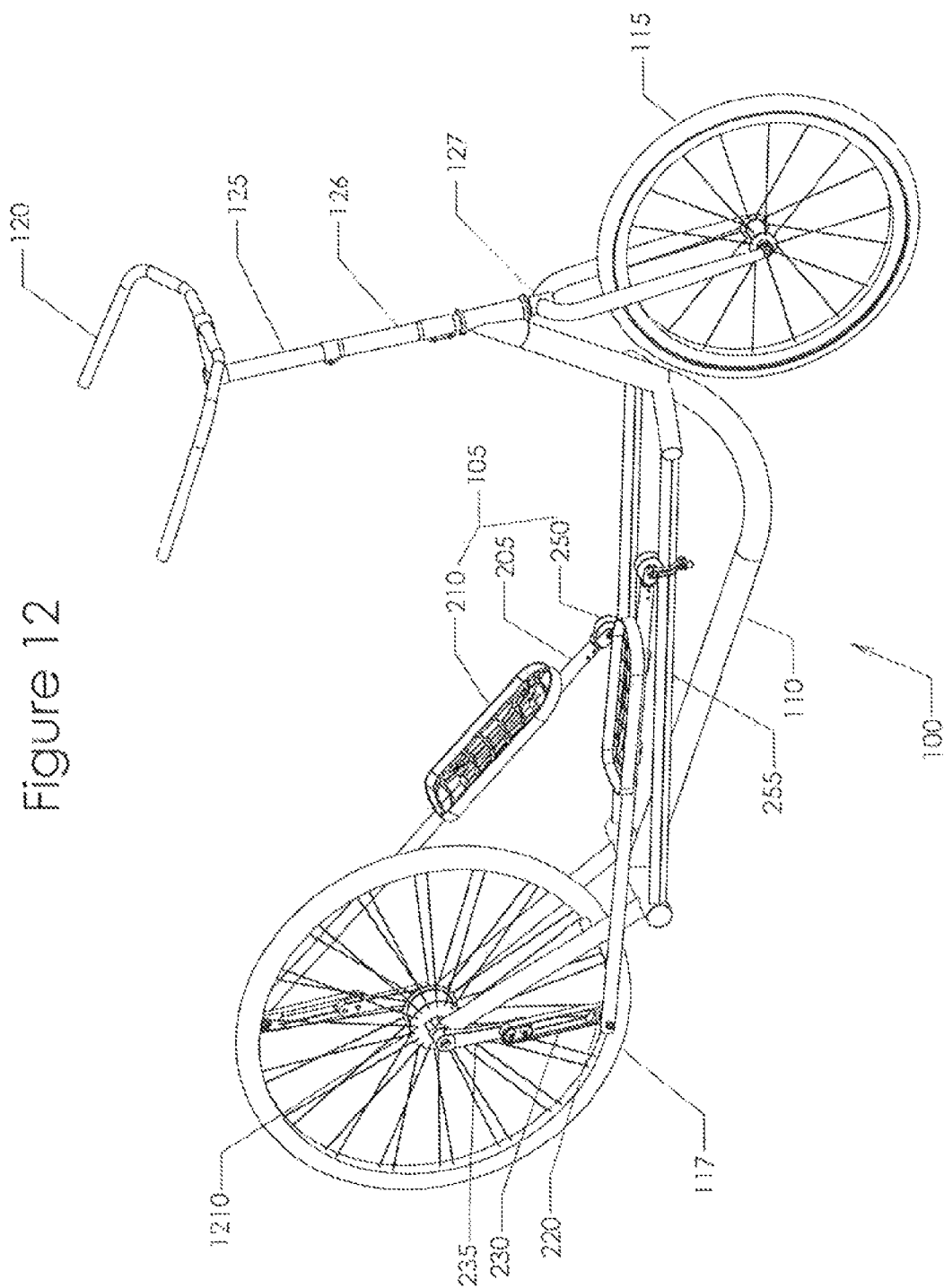

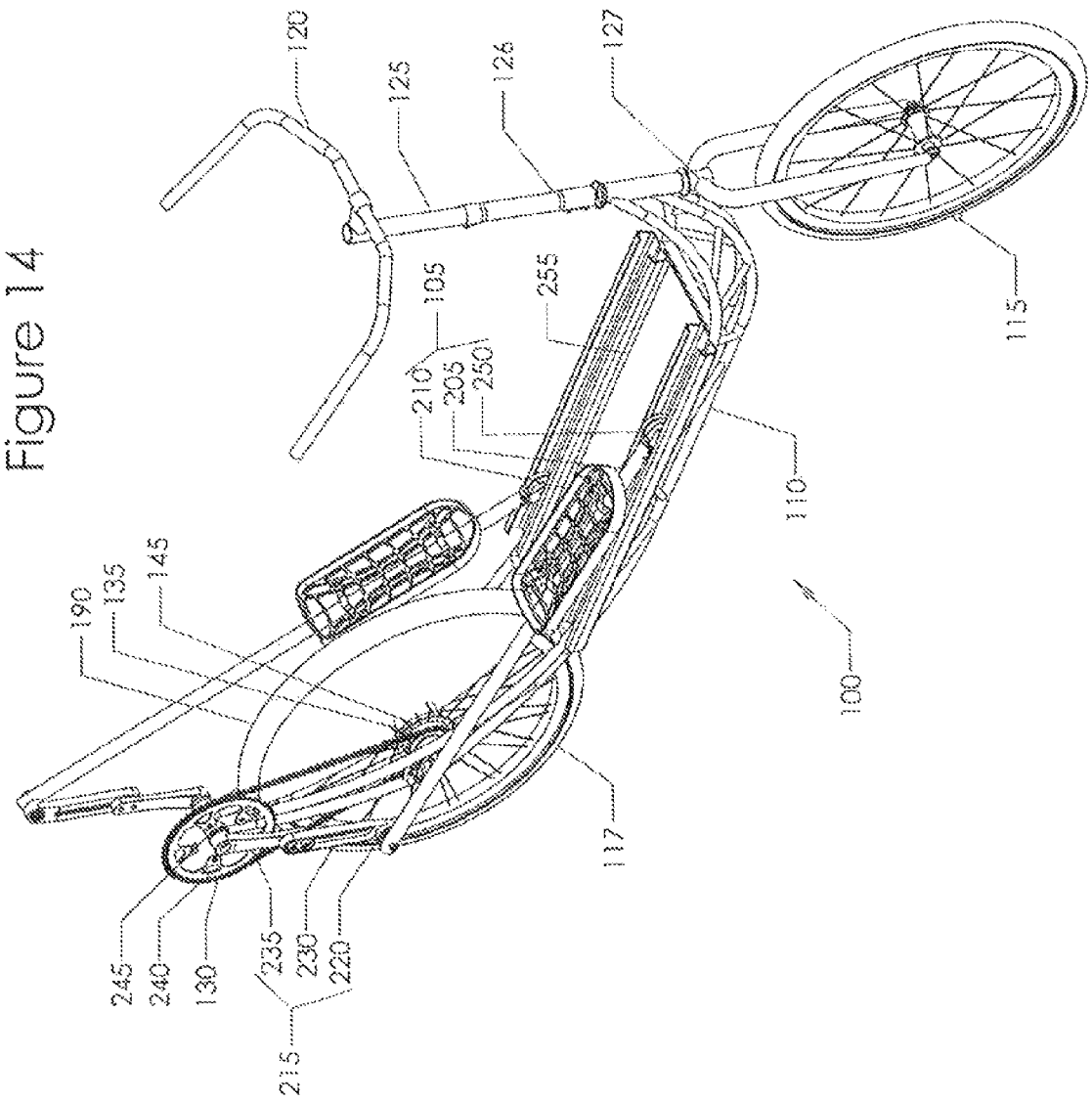

SELF-PROPELLED VEHICLE PROPELLED BY AN ELLIPTICAL DRIVE TRAIN INCLUDING FOOT LINK GUIDE TRACK

CROSS REFERENCE TO RELATED APPLICATIONS

This application is a continuation of application Ser. No. 11/899,100 filed on Sep. 4, 2007 and claims priority to Provisional Application Ser. No. 60/860,570, filed Nov. 21, 2006 under 35 U.S.C. 119(e). All of these applications are incorporated herein in their entirety by this reference.

FIELD OF THE INVENTION

The present invention generally relates to bicycles. More particularly, the invention concerns a bicycle having an elliptical drive train.

BACKGROUND OF THE INVENTION

The most common human-powered vehicle is the bicycle. Use of the bicycle for exercise, recreation, and transportation is well-known. Operators of conventional bicycles are in a seated position and pedal in an essentially circular motion to perform the mechanical work necessary to propel the vehicle. During operation, the operator's upper body is typically bent forward at the waist and held in place by the muscles of the arms, shoulders, abdomen, and lower back. This most common riding position is relatively stressful. Bicycle riders often experience pain, discomfort, and/or numbness in the pelvic region from sitting on the bicycle seat or "saddle", and discomfort in the lower back, arms, and shoulders from the bent-over riding position.

To alleviate the discomfort associated with prolonged use of conventional bicycles, recumbent bicycles in which the operator propels the bicycle from a reclined position are known. Although recumbent bicycles alleviate much of the discomfort associated with conventional bicycles, the reclined riding position makes these vehicles less stable and more difficult to ride. The recumbent bicycle is also limited as a commuter vehicle because the low-to-the-ground configuration allows obstacles to easily obstruct the operator's line of sight and makes him or her less visible to other vehicles, cyclists, and pedestrians. In addition, because operators of conventional and recumbent bicycles are seated, they do not receive the musculoskeletal benefits of weight-bearing exercise when operating these vehicles.

Therefore, there remains a need to overcome one or more of the limitations in the above-described, existing art.

BRIEF DESCRIPTION OF THE DRAWINGS

FIGS. 10A-L show side elevation views of different embodiments of load wheel retention devices that may be coupled to the bicycle;

FIG. 12 shows a perspective view of one embodiment of a direct drive system that may be coupled to the bicycle;

FIG. 14 shows a perspective view of yet another embodiment of the bicycle.

Figure 1:
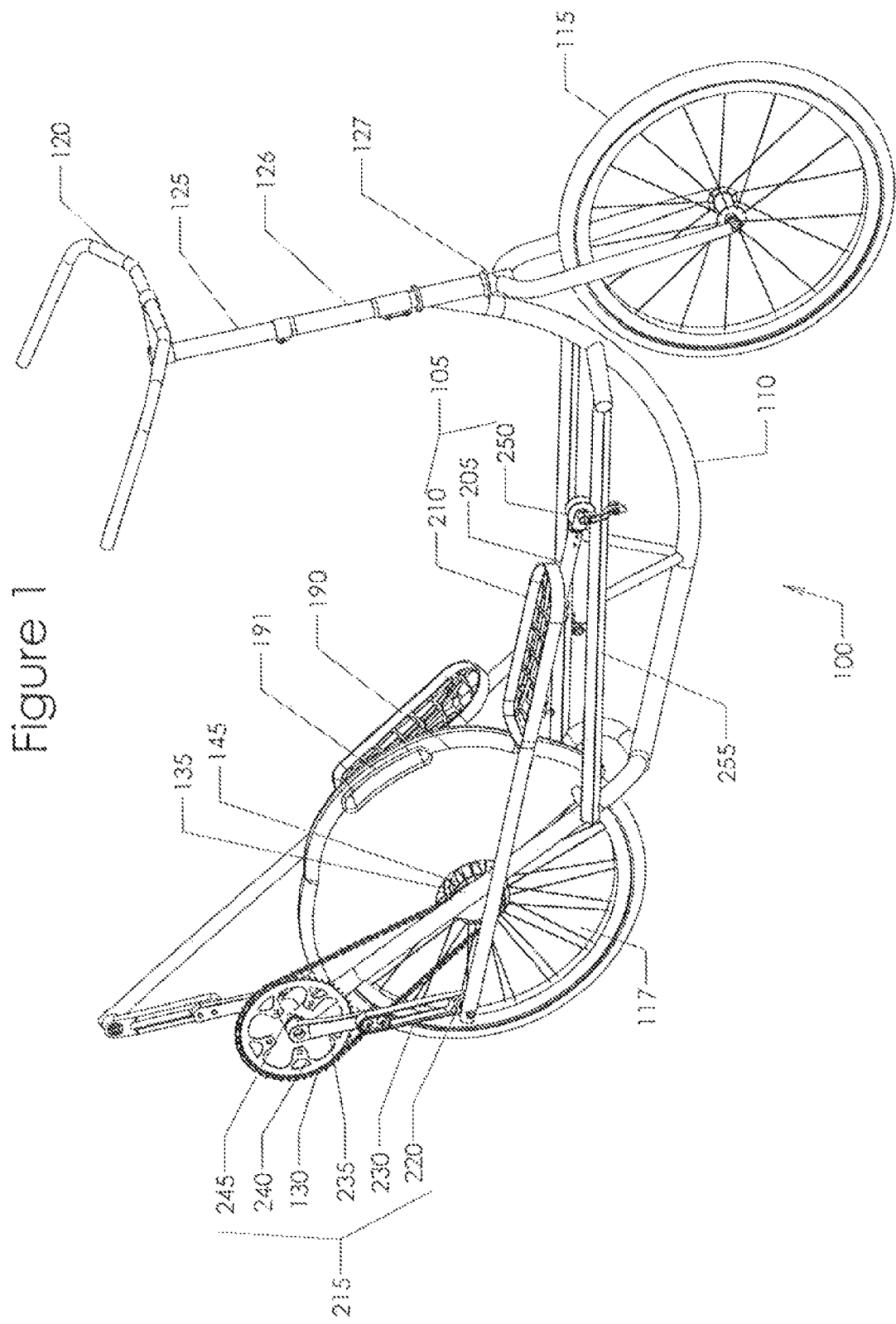
FIG. 1 shows a perspective view of one embodiment of the bicycle.

It will be recognized that some or all of the Figures are schematic representations for purposes of illustration and do not necessarily depict the actual relative sizes or locations of the elements shown. The Figures are provided for the purpose of illustrating one or more embodiments of the bicycle with the explicit understanding that they will not be used to limit the scope or the meaning of the claims.

DETAILED DESCRIPTION OF THE PREFERRED EMBODIMENTS

In the following description, for the purposes of explanation, numerous specific details are set forth in order to provide a thorough understanding of the bicycle of the present invention. It will be apparent, however, to one skilled in the art that the bicycle may be practiced without some of these specific details. For example, a variety of load wheel retention devices may be employed. Throughout this description, the embodiments and examples shown should be considered as exemplars, rather than as limitations on the bicycle. That is, the following description provides examples, and the accompanying drawings show various examples for the purposes of illustration. However, these examples should not be construed in a limiting sense as they are merely intended to provide examples of the bicycle rather than to provide an exhaustive list of all possible implementations of the bicycle.

The present disclosure relates generally to human-powered transportation, and more specifically to transport, exercise, and recreational vehicles powered by an elliptical pedaling motion that generally mimics the kinematics of walking or running. The apparatus, of which one embodiment is a bicycle, described herein provides an improved means of human-powered transportation that has advantages over conventional bicycles, scooters, upright step-cycles, and other human-powered vehicles.

As defined herein, a "bicycle" is every vehicle propelled, at least in part, by human power in the form of feet, or hands, acting upon pedals, having at least two wheels, except scooters and similar devices (which are defined as vehicles operated by a foot contacting the ground). The term "bicycle" also includes three and four-wheeled human-powered vehicles.

More specifically, disclosed herein is a low cross-over height bicycle powered by an elliptical pedaling motion that generally mimics the kinematics of running or walking and provides a means of human-powered transportation that has advantages over conventional upright step-cycles, bicycles, and scooters. Also disclosed herein are methods for enabling the operator to adjust the pedaling profile of such a vehicle.

An upright step-cycle is known in the art, but has several drawbacks. For example, the length of the wheelbase of several upright step-cycles described limits the means by which they can be transported in another vehicle, such as a passenger car, and prevents them from being turned around on narrow bike paths or streets without the operator dismounting the vehicles. Conventional upright step-cycles also have sprockets and a chain positioned near the operator. If contacted, these moving parts can damage the operator's clothing and/or injure the operator. Furthermore, conventional upright step-cycles have frames that position support structures in the operator's zone, discussed in detail below. Frame members located in the operator's zone are likely to injure the operator if he or she contacts them while riding or during a fall. Frame members located in the operator's zone also make mounting and dismounting the vehicle more difficult.

In addition, conventional upright step-cycles lack several features that could enable the operator to easily modify the vehicle's pedaling profile and thereby allow a single vehicle to be adjusted to accommodate a wide range of different sized riders. As discussed above, the path of motion through which the operator's foot travels while pedaling these vehicles is generally elliptical. Some people prefer this generally elliptical motion to the generally circular motion used to propel a conventional or recumbent bicycle because the generally elliptical motion more closely mimics walking, running, or climbing and has been shown to be a more effective means for strengthening the leg muscles than cycling while avoiding much of the stress and impact generated by running. However, because the pedaling motion mimics human movement, operators with different anatomical dimensions will generally require different pedaling profiles. Specifically, a taller operator would likely require a pedaling profile with a longer stride length than a shorter operator would. In addition, a more aggressive operator might prefer a steeper foot platform take-off angle so that he or she could generate more low-end torque, while a less aggressive rider might prefer a flatter pedaling profile to reduce foot and knee flexion during the pedal stroke.

As discussed below, the shape of the pedal stroke is generally determined by the length of the crank arms, the length oldie foot links, the location of the foot platforms on the foot links, and the angle of the foot link guide tracks. Conventional upright step-cycles lack easy methods for adjusting the length of the crank arms and the location of the foot platforms. Enabling operators to easily optimize the pedaling profile by adjusting these aspects of the propulsion system would enhance the functionality of an upright step-cycle.

Another form of human-powered transportation is the scooter. Conventional scooters are operated in a standing position. The operator propels a scooter forward by pushing one leg against the ground in a rearward direction. Scooters have the advantage of being more comfortable to ride than conventional bicycles without many of the drawbacks of recumbent bicycles. Because the operator of a scooter rides in an upright position, he or she does not experience the numbness and pain caused by sitting on a seat or saddle. In addition, the operator is less susceptible to shoulder and lower back pain because he or she is not hunched over the handlebars. As compared to a recumbent bicycle, the operator's standing position reduces the likelihood that his or her line of sight will be obstructed and makes him or her more visible to other vehicles and pedestrians. A scooter is also more stable and easier to ride than a recumbent bicycle, thereby reducing the frequency of falling for unskilled operators. Moreover, riding a scooter is a weight-bearing exercise that provides the operator with a means of strengthening the leg muscles and bones that is not available to operators of conventional and recumbent bicycles.

However, the scooter does have disadvantages. Although an operator can travel longer distances at higher speeds on a scooter than he or she generally could by walking or running, a scooter's propulsion mechanism is not very efficient, especially when compared to that of a conventional bicycle. As a result, scooters are generally not used for business commuting, sustained exercise, or for other applications that require long-distance or high-speed travel.

Mechanical devices that improve the efficiency of conventional scooters are known. A typical pedal-driven scooter is propelled forward by the operator pumping one or two platforms up and down. Although this mechanism can be a more efficient means of propulsion than pushing backwards against the ground, it is not ideal because it must be translated into rotational motion to propel the vehicle forward. These mechanisms can also cause knee injuries because of the operator's need to reverse his or her leg's direction of motion at the top and bottom of each pedal stroke. Therefore, the introduction of a more efficient and lower impact scooter propulsion system would enhance the utility of pedal driven scooters.

With reference now to the Figures, disclosed herein is an operator-propelled vehicle in which rotation of left and right crank arms causes the respective left and right foot platforms to move along an elliptical path. The term "elliptical" with regard to "elliptical pedaling motion" or "elliptical pedaling profile" or "elliptical path" or "elliptical motion" is intended in a broad sense to describe a closed path of motion having a relatively longer first axis and a relatively shorter second axis (which extends perpendicular to the first axis as in an ellipse).

The embodiments shown and described herein are generally symmetrical about a vertical plane extending lengthwise. Reference numerals are generally used to designate both the "right-hand" and "left-hand" parts, and when reference is made to one or more parts on only one side of the apparatus, it is to be understood that corresponding part(s) may be disposed on the opposite side of the apparatus. The portions of the frame that are intersected by the plane of symmetry exist individually and thus, may not have any "opposite side" counterparts. Also, to the extent that reference is made to forward or rearward portions of the apparatus, it is to be understood that the drive arm assembly is movable in either of two opposite directions.

FIG. 1 shows a general embodiment of the apparatus, or bicycle 100. The apparatus 100 generally includes a foot link assembly 105 movably mounted on a frame, or frame structure 110 on which a pair of wheels (front wheel 115; rear wheel 117) are mounted. Generally, each foot link assembly 105 is moveably mounted to the frame 110 at its forward end where it is slideably coupled to a foot link guide track 255 and at its rearward end where it is rotatably coupled to the crank assembly 215.

Generally, each foot link assembly 105 includes a foot link 205, each with a foot platform 210, and a load wheel 250. The foot platforms 210 on which the operator stands are mounted on an upper surface of each foot link 205 near a forward end of each foot link 205. Below each foot platform 210 near the frontal section of each foot link is a load wheel 250 that contacts a sloping foot link guide track 255. In the embodiment depicted in FIG. 1, two foot link guide tracks 255 run parallel to each other on either side of the longitudinal axis of the apparatus 100 and are integral with the frame 110. The load wheel 250 and bearings are mounted to a fixed axle to allow nearly frictionless linear motion of the foot links 205 along the foot link guide tracks 255 and provide rotational freedom of the foot links 205 with respect to the foot link guide tracks 255.

Figure 2:
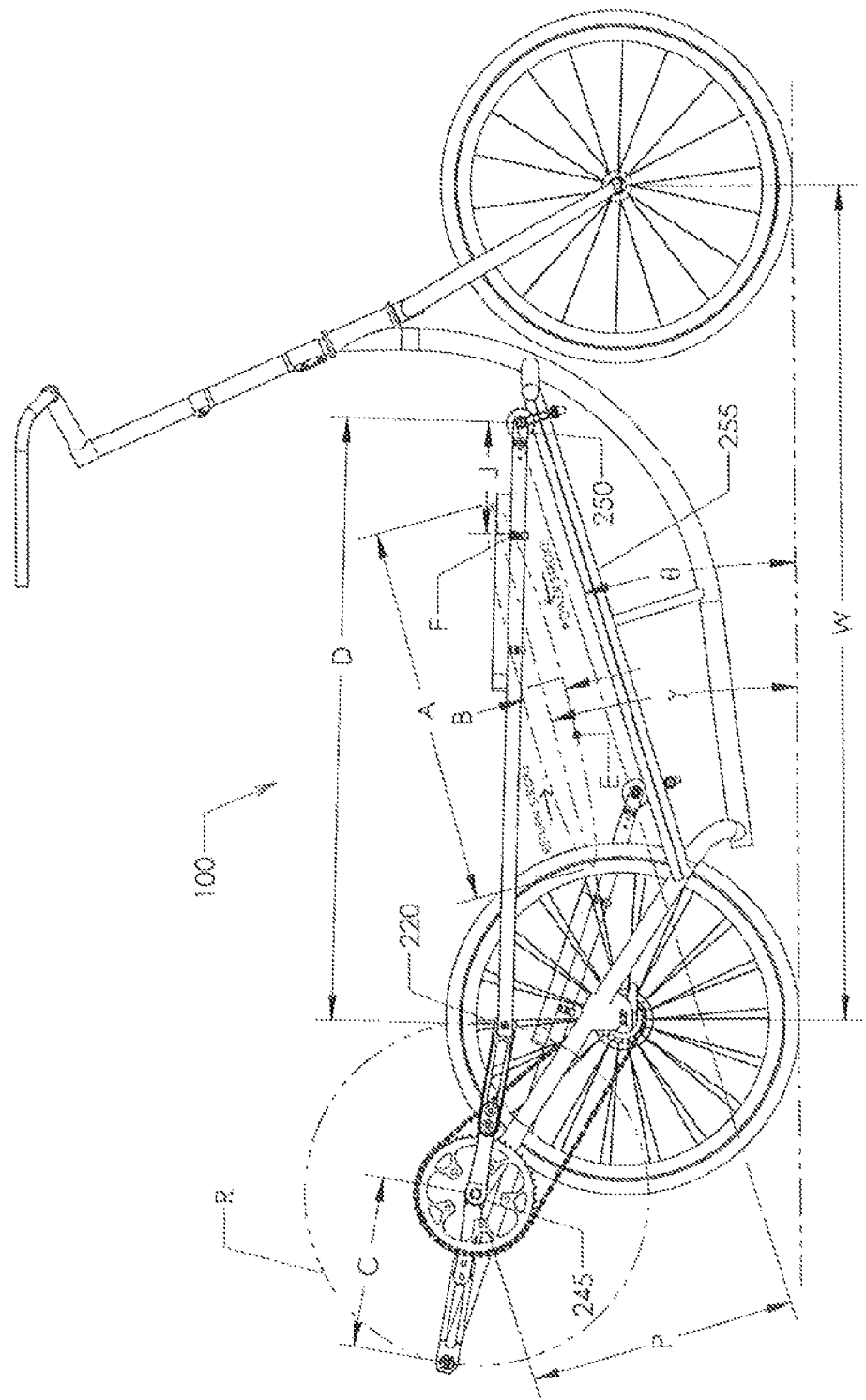
FIG. 2 shows a side elevation view of the bicycle of FIG. 1, depicting schematically the elliptical pedaling profile.

As shown in FIG. 2, during pedaling, the operator (not shown) uses his mass in a generally downward and rearward motion as in walking or jogging to exert a force on the foot platforms 210 and thereby, the foot links 205. This force causes the load wheel to roll down the slope of the foot link guide track 255 towards the rear of the apparatus 100 and rotate the crank arms 235 about the crank arm bearing 245, turning the drive sprocket 240. As with conventional bicycles, rotating the drive sprocket 240 causes the rear wheel sprocket 135 to rotate because they are linked by a chain or belt 130. It will be appreciated that the chain or belt 130 may also comprise a rotating shaft or other drive means. Rotating the rear wheel sprocket 135 causes the rear wheel 117 to rotate because the rear wheel sprocket is attached to the rear wheel hub 145. Rotating the rear wheel 117 provides motive force that enables the apparatus 100 to move along a surface. The apparatus 100 can employ a "fixed" or "free" rear wheel, as is known in the art. The apparatus 100 can also employ a planetary gear hub having different gear ratios, as manufactured by Shimano, Sturmey-Archer and others.

One feature of the apparatus, or bicycle 100 is that the pedaling motion described above results in the operator's foot traveling in a shape that can be described as generally elliptical. Propulsion using an elliptical pedaling motion, as opposed to an up and down pedaling motion or a circular pedaling motion, has the advantage of substantially emulating a natural human running or walking motion. Further, an elliptical pedaling motion is a simpler and more efficient means to rotate the rear wheel 117 than is, for example, a vertical pumping motion. Moreover, the major axis of the ellipse in an elliptical pedaling motion can be much longer than the stroke length of a circular or vertical pumping pedaling motion, allowing the operator to employ a larger number of muscle groups over a longer range of motion during the pedal stroke than he or she could employ in a circular or up and down pedaling motion.

As shown in FIG. 2, dashed line E depicts the generally elliptical path that the ball of the operator's foot would take throughout the pedaling motion. The region where the ball of the operator's foot contacts the foot platform 210 is labeled as item F. The power stroke during forward motion is from front-to-back and follows the lower half of the elliptical path E. As the operator's foot moves rearward through the power stroke of the described elliptical pedaling motion, the heel portion falls more quickly than does the toe portion. The return stroke during forward motion is from back-to-front and follows the upper half of the elliptical path E. As the operator's foot moves forward through the return stroke of the described elliptical pedaling motion, the heel portion of the foot rises more quickly than does the toe portion.

As illustrated in FIG. 2, the shape of the elliptical path E is generally defined by the following parameters: (1) the length of the major axis A; (2) the length of the minor axis B; and (3) the major axis angle γ. The length of the major axis A is generally equal to the stride length of the pedaling motion. The length of the minor axis B relative to the length of major axis A generally determines the vertical lift of the operator's foot and angular foot plantar-flexion throughout the pedaling motion. Decreasing the ratio of A to B increases the vertical lift of the operator's foot and increases the angular foot plantar-flexion. Conversely, increasing the ratio of A to B reduces the vertical lift of the operator's foot and decreases the angular foot plantar-flexion. As the ratio of A to B approaches infinity, the elliptical path E collapses into a straight line of length A and eliminates the vertical lift altogether.

The major axis angle γ of the ellipse reflects the incline angle of the pedaling motion. A major axis angle γ of zero degrees emulates natural walking or running motion on flat ground. Increasing the major axis angle γ emulates natural walking or running motion on an incline. Foot link guide track angle θ is the angle of the foot link guide track 255 from horizontal and is generally parallel with the major axis angle γ.

The three parameters that govern the shape of the generally elliptical pedaling path E (major axis A, minor axis B, and major axis angle γ, discussed above) are generally a function of the following frame and drive mechanism dimensions: crank arm length C, foot link length D, crank pivot offset P, operator foot offset J, and foot link guide track angle θ Crank arm length C is the distance between the center of the crank arm bearing 245 to the foot link bearing 220. Foot link length D is the distance between the center of the load wheel 250 and the foot link bearing 220. Operator foot offset J is the distance from the center of the load wheel 250 to the region where the ball of the operator's foot contacts the foot platform, point F. Foot link guide track angle θ is the angle of the foot link guide track 255 from horizontal and is generally parallel with the major axis angle γ. As discussed below, modifying these parameters will change the elliptical pedaling profile experienced by the operator.

Figure 3:
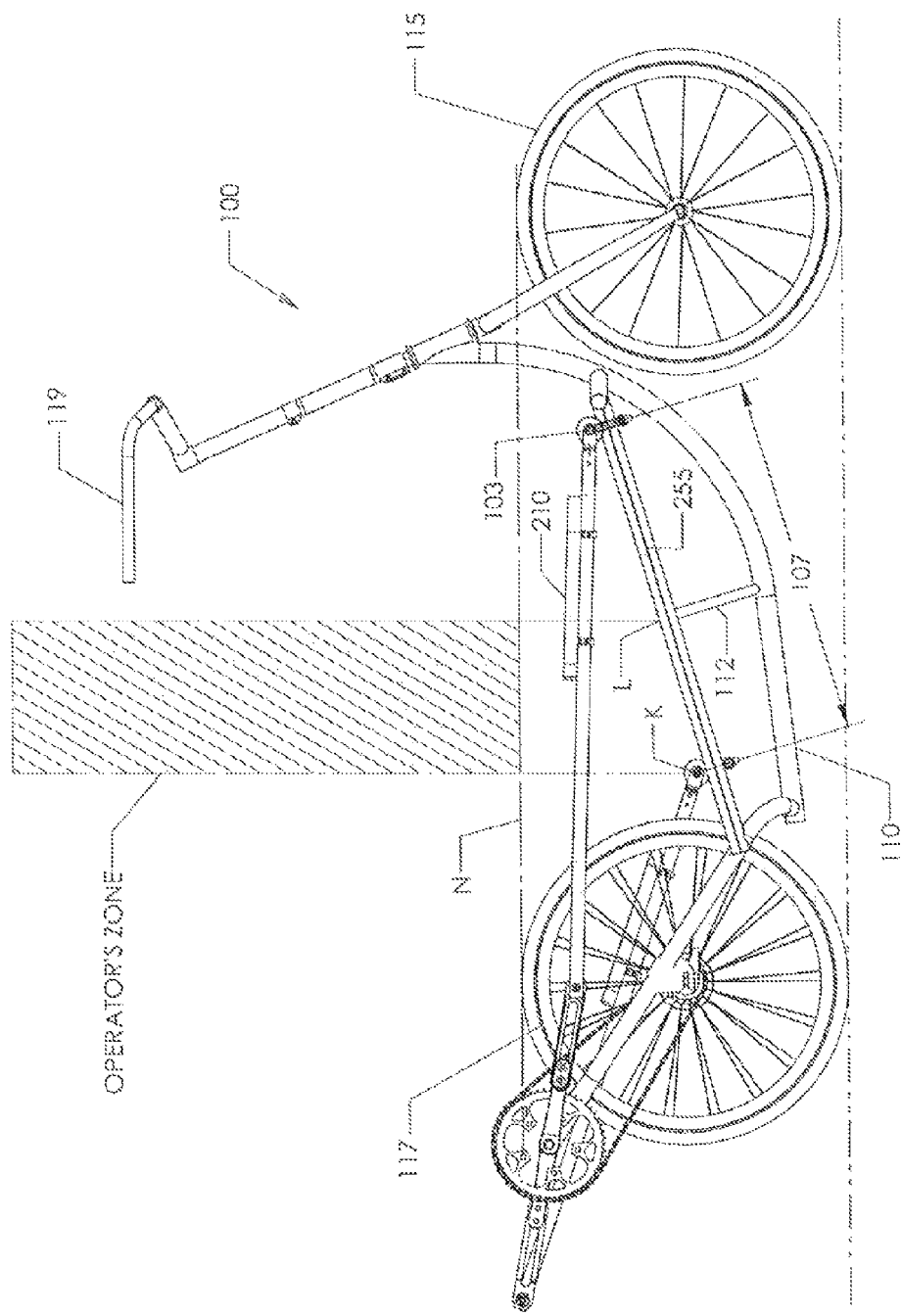
FIG. 3 shows a side elevation view of the bicycle of FIG. 1, depicting schematically an operator's zone.
Figure 4:
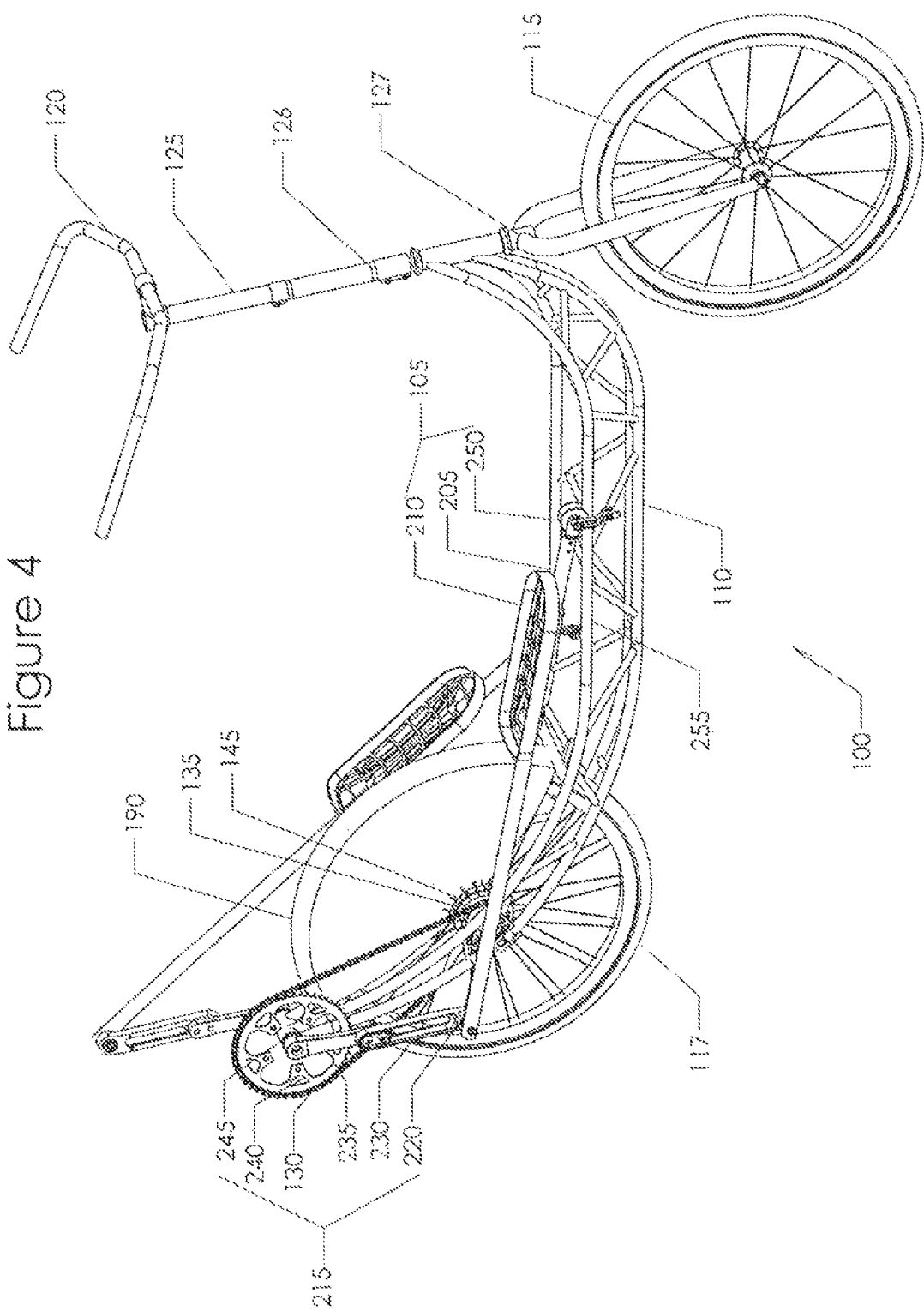
FIG. 4 shows a perspective view of another embodiment of the bicycle.
Figure 5:
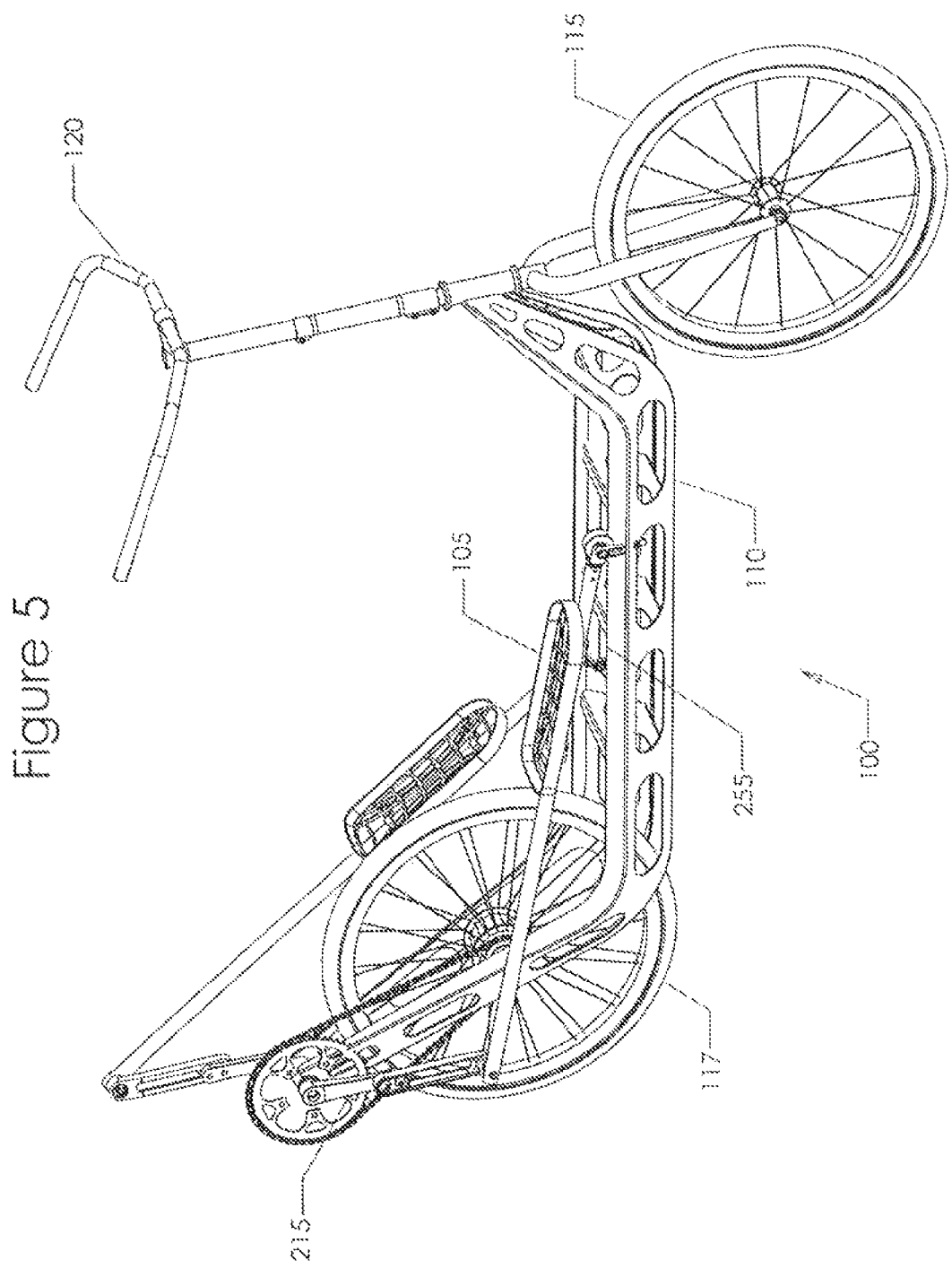
FIG. 5 shows a perspective view of yet another embodiment of the bicycle.
Figure 6:
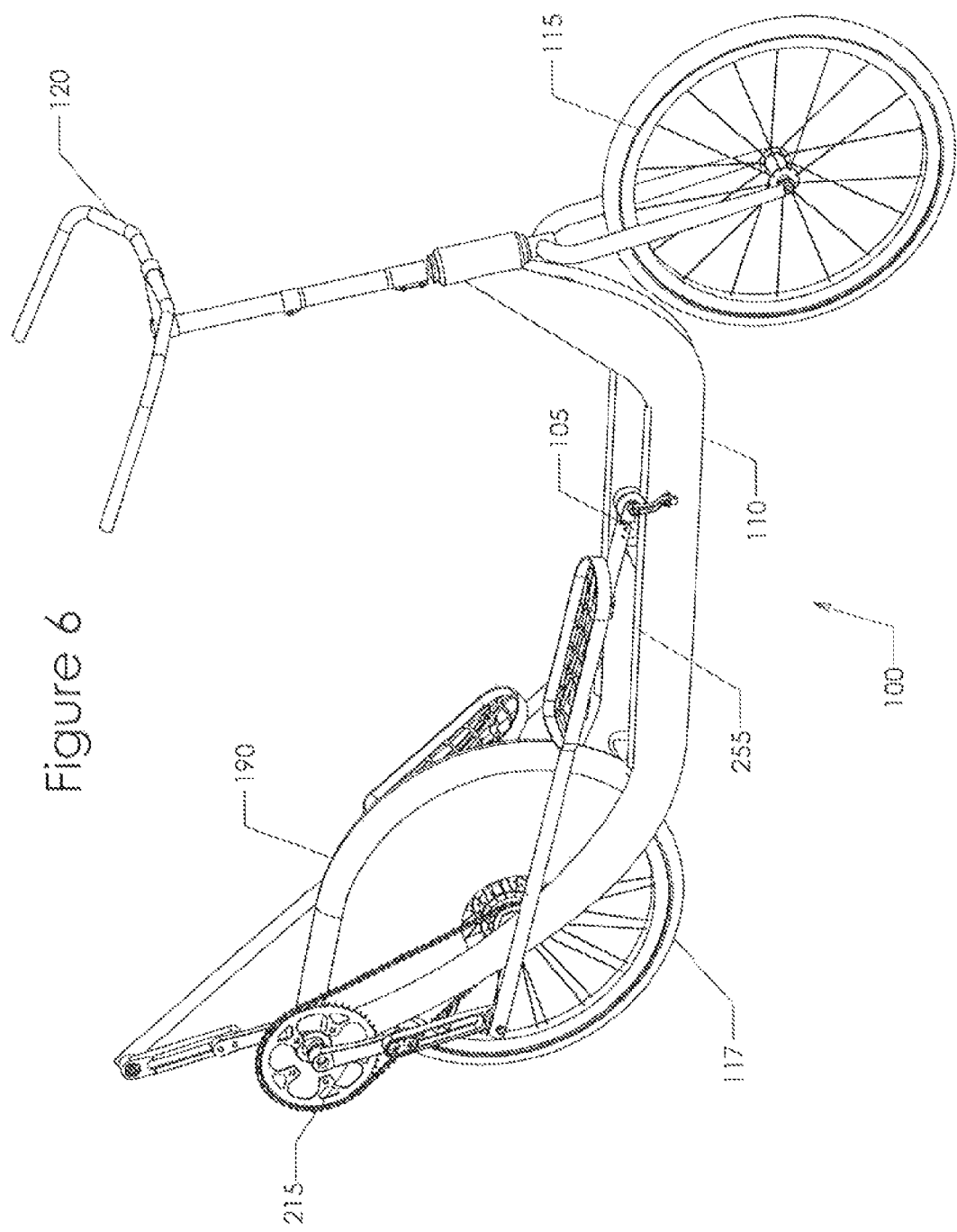
FIG. 6 shows a perspective view of yet another embodiment of the bicycle.

As illustrated in FIGS. 1-7, the frame, or frame structure 110 of the apparatus 100 can be comprised of a variety of materials. FIG. 1 depicts one embodiment of the apparatus 100 in which the frame 110 is comprised of a rigid tubular metal, such as aluminum, steel, or titanium. As illustrated in FIG. 1, the frame structure 110 includes a lower frame member and two foot link guide tracks 255 that, in this embodiment, also act as structural frame members. FIG. 5 depicts an embodiment of the apparatus 100 in which the frame 110 is comprised of sheet metal, and in this embodiment, one frame member may be the lower portion of the frame 110 (nearest the ground) and a second frame member may be the foot link guide track 255 that comprises an upper portion of the frame 110. FIG. 6 depicts an embodiment of the apparatus 100 in which the frame 110 is comprised of a graphite composite, and in this embodiment, similar to the embodiment illustrated in FIG. 5, one frame member may be the lower portion of the frame 110 (nearest the ground) and a second frame member may be the foot link guide track 255 that comprises an upper portion of the frame 110, even though the two frame members may be formed together.

Other materials may also be used to construct the frame for the apparatus, such as plastics, alloys, other metals, etc. The frame 110 provides the structural rigidity necessary to support the rider while he or she is operating the apparatus 100. The frame 110 also connects the movable portions of the apparatus 100 together into a complete system.

One of the features common to all of the proposed embodiments of apparatus 100 is a low cross-over height frame. As defined herein, a frame has a low cross-over height if there are no structural frame members positioned in the operator's zone. The operator's zone is the area of space occupied by the operator when riding the apparatus. One embodiment of the operator's zone is illustrated in FIG. 3, and comprises an area defined by points K and L, and line N. Point K is the aft-most position of the load wheel 250, point L is the mid-point of travel of the load wheel 250, and line N is formed by a line that extends between the tops of the front wheel 115 and rear wheel 117. During operation, the load wheel 250 travels from a forward-most position 103 to a rear-most, or aft-most position K. As shown in FIG. 3, the mid-point of travel for the load wheel 250 is point L, which is half the distance of the load wheel total distance of travel 107. Put differently, the load wheel total distance of travel 107 is the maximum stride length that an operator would be able to achieve, and may range from about 14 inches to about 26 inches. As shown in FIG. 3, the operator's zone extends from line N upwards, and is bounded by two substantially vertical lines that extend from points K and L.

It will be appreciated that the operator's zone may extend further forward or backward depending on the amount of forward and rearward movement the operator must undertake when operating a specific embodiment of the apparatus. For example, for some embodiments, point L may be defined as the location of the ball of the operator's foot when it is located at the forward extreme of the pedal stroke (point 103) on the foot platform 210, and point K may be defined as the heel of the operator's foot when it is on the foot platform 210 and the load wheel 250 is at its aft-most position. Similarly, it may be appreciated that for embodiments where the front wheel 115 and the rear wheel 117 are small (have diameters less than 20 inches), line N may be set at a given distance off of the ground (approximately 26 inches) rather than formed by a line that extends between the tops of the front wheel 115 and rear wheel 117.

FIGS. 1, 4, 5, 6, 7, 12, 13, and 14 depict several different proposed embodiments, all of which have low cross-over height frames 110. As shown in FIG. 3, generally, the frame 110 includes truss members 112 and two foot link guide tracks 255. However, some frame 110 embodiments, like those shown in FIGS. 5 and 6, do not include truss members 112. Moreover, the foot link guide tracks 255 may be an integral component of the frame, as shown, for example, in FIGS. 4-6. The individual guide tracks may also be integrated together to form a single guide track, as depicted in FIG. 14.

Low cross-over height frames 110 are safer and more convenient to use than conventional upright step-cycle or bicycle frames. The low cross-over height design is safer because there are no support structures in the operator's zone that could cause injury during a fall or during riding. These frames are also more stable to ride because they have a lower center of gravity. The low cross-over height design also makes the apparatus 100 easier and safer to mount and dismount because there are no support structures in the operator's zone to step over or around when mounting or dismounting. In addition, the low cross-over height makes the apparatus 100 easier to maneuver in tight spaces because it enables the operator to easily step across the apparatus 100, which facilitates moving the apparatus 100 into and out of storage areas, trains, buildings, and the like.

One consideration when designing low crossover-height frames 110 is stiffness in bending. Unlike conventional frames, a low cross-over height frame 110 does not include a structural member above the plane of the top of the wheels to provide stiffness in bending. Because the frame 110 must support the dynamic weight of the operator during riding, stiffness in bending is important not only to prevent frame member failure, but also to improve pedaling efficiency and handling.

The proposed embodiments have been designed to provide sufficient frame 110 stiffness in bending. For example, the frame 100 design in FIG. 4 has a stiffness of approximately 2500 lbf/in. When the embodiment depicted in FIG. 4 is subjected to a 200 pound load in the center of the foot link guide tracks 255, the frame 110 will deflect no more than about 0.08 inches, thereby minimizing the negative effects of frame flexing discussed above. This improved stiffness in bending is achieved by several features contained in the low cross-over height frame 110, including incorporation of the foot link guide tracks 255 into the frame 110 as frame members, and the use of truss members 112 to enhance stiffness.

As shown in several of the Figures, embodiments of the apparatus 100 include a steering mechanism 120 that may comprise handlebars 119, a steering wheel (not shown), or other steering means. The steering mechanism 120 can be mounted upon a fixed or adjustable steering extender 125 that extends upward from the frame 110. The steering mechanism 120 can be telescopically adjustable, as well as adjustable forward and backward, and can incorporate a pivot to provide rotational adjustability. One feature is that an adjustable steering mechanism will permit easy and safe use by a variety of operators having different heights and arm dimensions.

Figure 11:
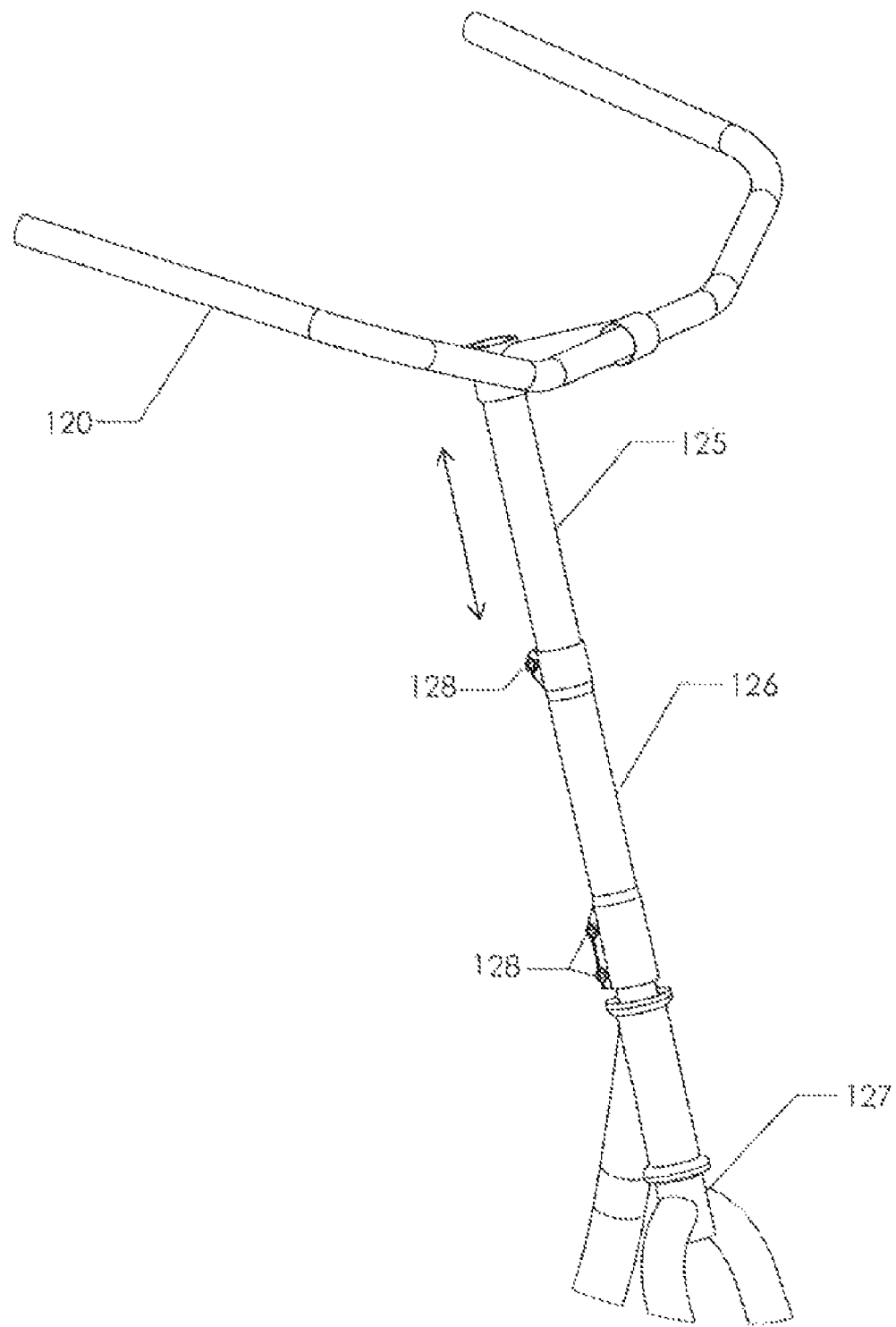
FIG. 11 shows a perspective view of one embodiment of an adjustable steering tube that may be coupled to the bicycle.
Figure 13A:
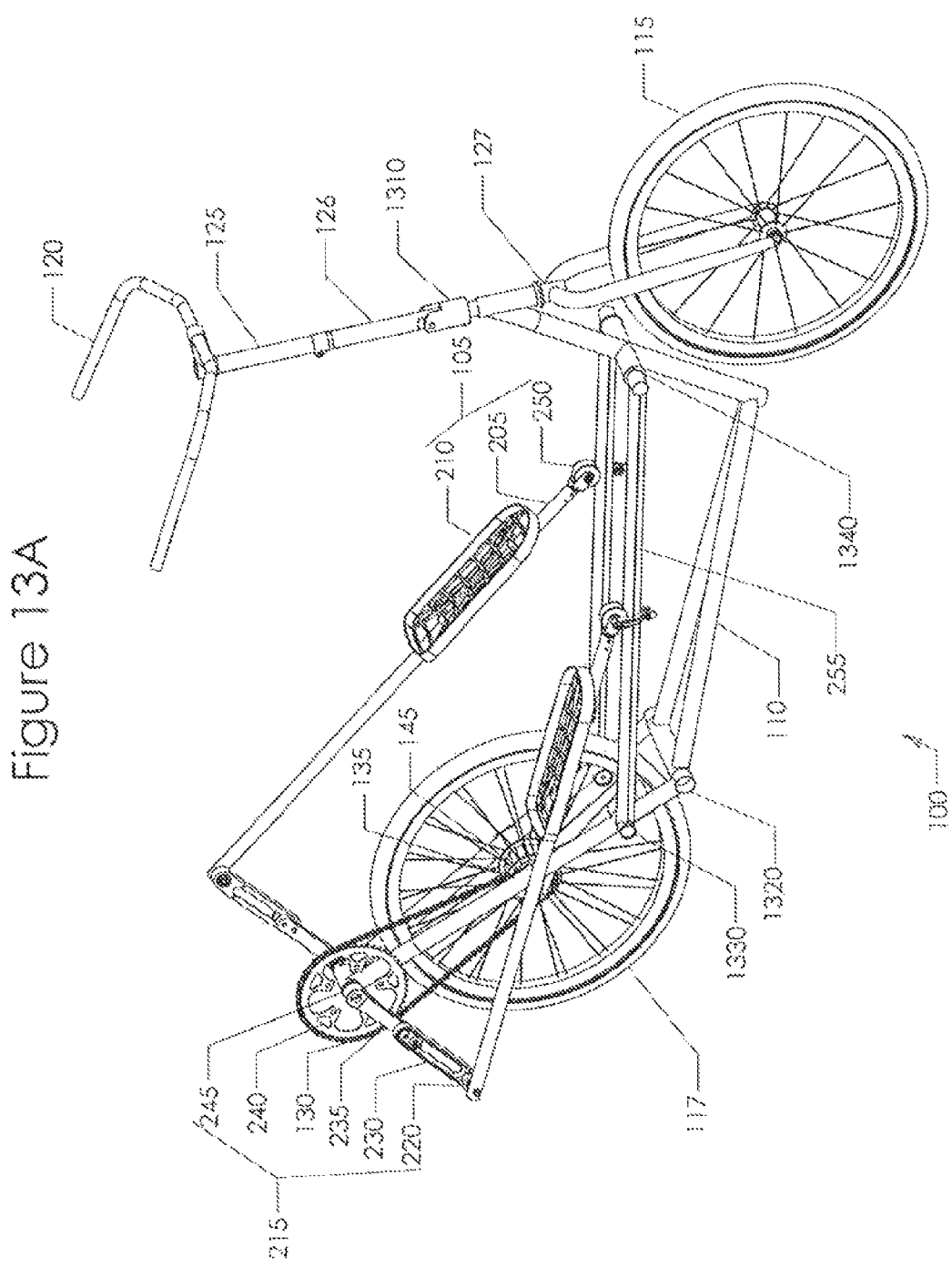
FIG. 13A shows a perspective view of another embodiment of the bicycle that includes a foldable frame.
Figure 13B:
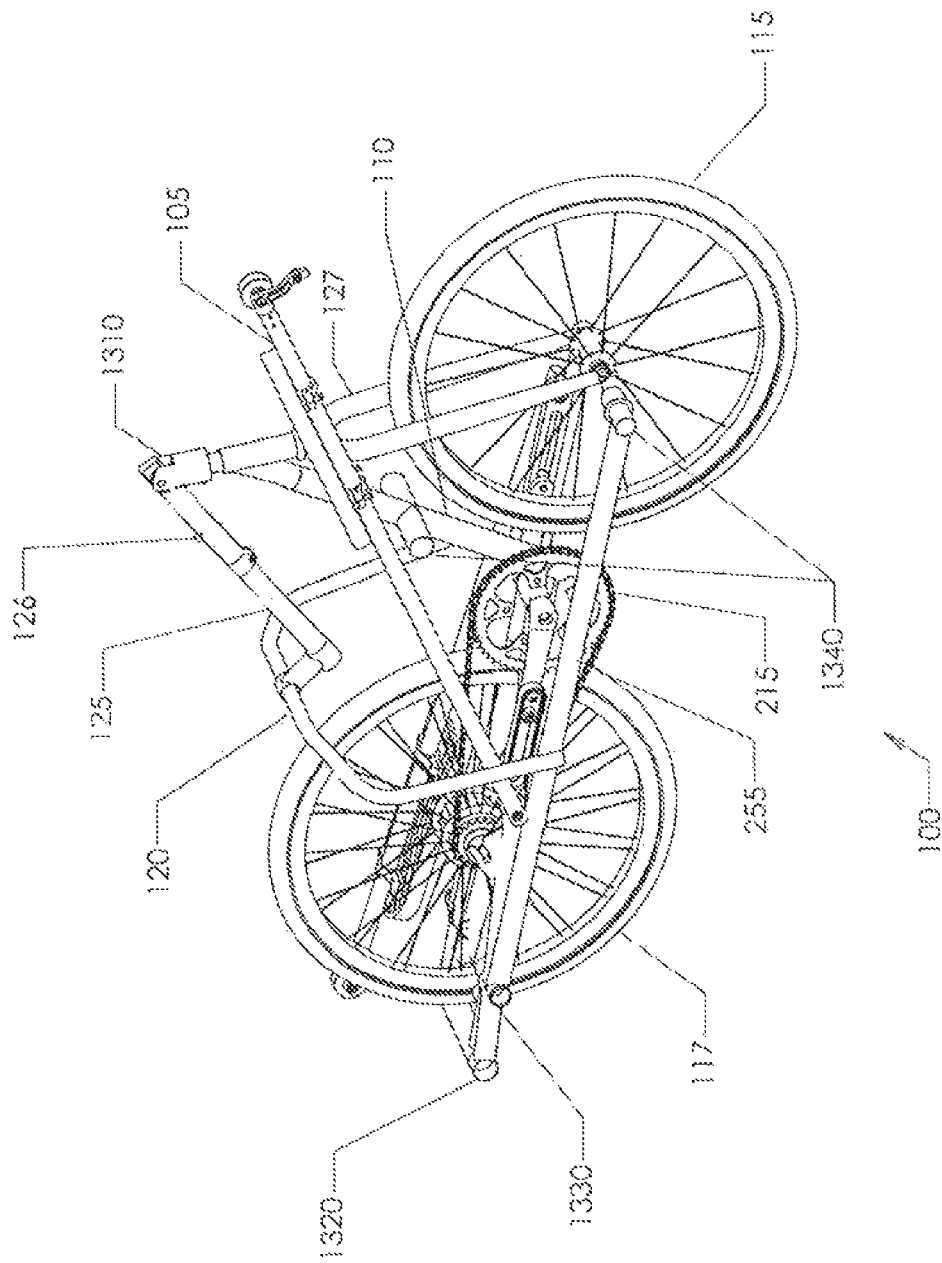
FIG. 13B shows a perspective view of the bicycle depicted in FIG. 13A after it has been folded.

FIG. 11 depicts a detailed view of one embodiment of a telescoping steering mechanism. In this embodiment, the steering extender 125 is held by a steering extender sleeve 126. The inside diameter of the steering extender sleeve 126 is larger than the outside diameter of both the front fork steer tube 127 and the steering extender 125. In this embodiment, the front fork steer tube 127 has been inserted into the bottom of the steering extender sleeve 126 and is clamped to it by means of one or more fasteners 128, such as a bolt and nut, pin, clip or other means. In addition, the steering extender 125 is inserted into the top of the steering extender sleeve 126 and is clamped to it by means of another fastener 128. The height of the steering mechanism 120 can be adjusted by varying the position where the steering extender sleeve 126 clamps to the steering extender 125. FIGS. 13A-B depict a steering tube assembly with both translational and rotational adjustability.

As shown in FIGS. 1, 4, and 6, embodiments of the apparatus 100 can also incorporate a rear wheel cover 190. The purpose of the rear wheel cover 190 is to prevent the operator's legs, feet, clothing, and other objects from contacting the rear wheel 117. The cover 190 can be made from metal, plastic, graphite composite, fiberglass, or other materials. It can be attached to the frame by bolts, welds, brazes, or other methods, or it can be an integrated part of the frame 110 as shown in FIG. 6. To facilitate transporting and maneuvering the apparatus 100 while walking, a handle 191 can be attached to, or incorporated into, the rear wheel cover 190, or a handle 191 can be attached to, or incorporated into, the frame 110 and protrude through an opening in the rear wheel cover 190.

FIG. 1 depicts a rear wheel cover 190 with a handle 191. The handle 191 is integrated into the rear wheel cover 190 and the rear wheel cover 190 is bolted to the frame 110. FIG. 4 depicts a rear wheel cover 190 without a handle that is bolted to the frame 110. FIG. 6 depicts a rear wheel cover 190 without a handle that is integrated into a carbon fiber frame 110.

Figure 10C:
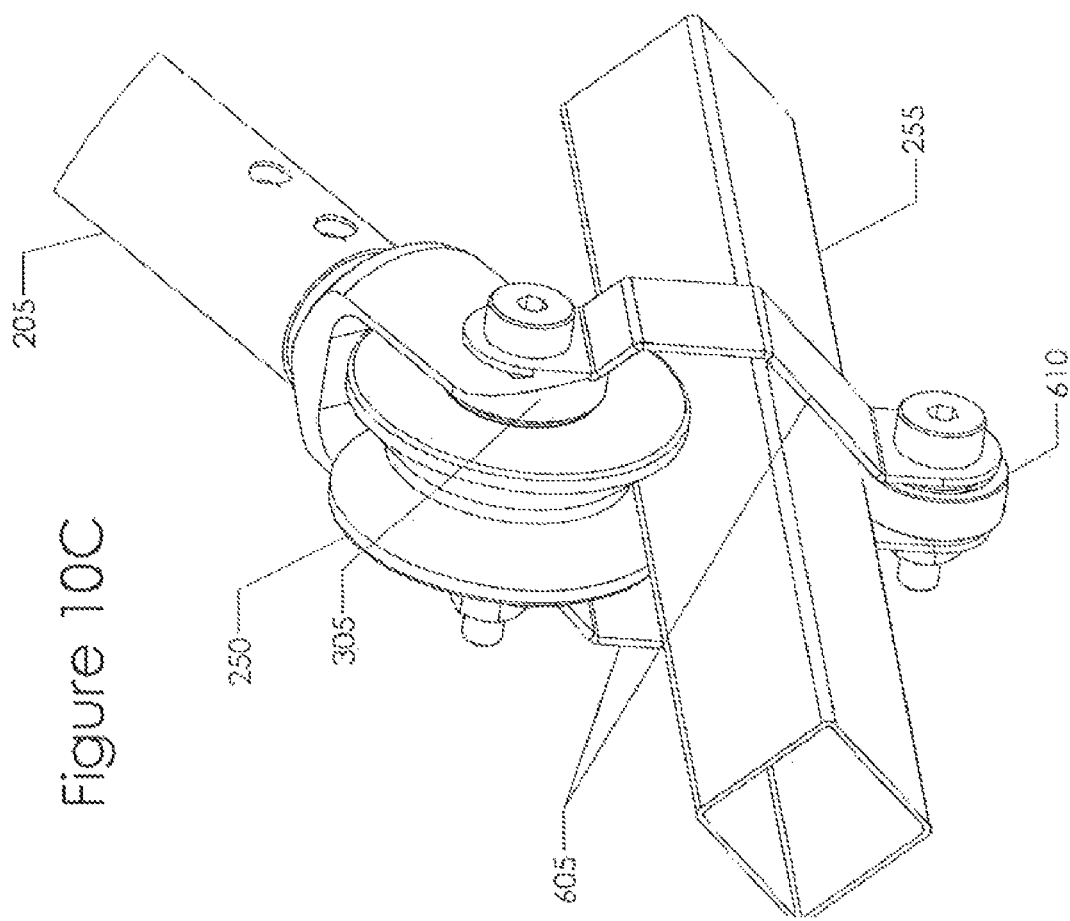

Referring now to FIGS. 10A-B, each foot link 205 can be laterally constrained onto its respective foot link guide track 255 in a variety of ways. FIGS. 10A and 10B, which is a sectional view about section M-M shown in FIG. 10A, and FIGS. 10C and 10F depict one method of laterally constraining the foot link 205. In this method, the load wheel 250 has a V-groove 305 that mates to the counterpart geometry of a substantially diamond-shaped foot link guide track 255. The top of the foot link guide track 255 fits into the center of the groove of the load wheel 305, thereby laterally constraining the foot link 205.

FIGS. 10D, 10i, 10J, and 10K depict a similar mechanism for laterally constraining a foot link 205 onto a round or tubular-shaped foot link guide track 255. In these embodiments, the contact surface of the load wheel 250 has a concave shape that mates with the counterpart geometry of the round foot link guide track 255. The top of the foot link guide track 255 aligns with the center of the load wheel 250 and the foot link 205 is laterally constrained onto the foot link guide track 255 by the interface of the concave load wheel 205 and the round tube comprising the foot link guide track 255.

FIG. 10E depicts another method of laterally constraining a foot link 205 onto a foot link guide track 255. This embodiment uses a load wheel carrier 271 that is attached to each foot link 205. In the depicted embodiment, the load wheel carrier 271 holds two load wheels 250. The load wheels 250 are set into the load wheel carrier 271 at opposing angles. The interaction of each load wheel 250 with the foot link guide track 255 results in the lateral constraint of the attached foot link 205. Although a diamond shaped foot link guide track 255 is depicted in FIG. 10E, this method could also be used with round, tubular, or similarly shaped foot link guide tracks 255.

The lateral constraining methods discussed above are intended to prevent the foot link assembly from laterally disengaging with, or "falling off" of, the foot link guide track 255. The list is not intended to be exhaustive. Its purpose is only to illustrate a few of the many methods of restraining the foot links 205 in the lateral direction.

In addition to lateral constraint, each foot link 205 may also be retained in the normal direction (a direction generally perpendicular to the foot link guide track 255). That is, each foot link 205 may be restrained from "jumping off" the foot link guide track 255. The foot links 205 could be subject to disengaging in the normal direction whenever, for instance the apparatus 100 travels over sharply undulating or rough terrain, or strikes an obstacle. The retention methods discussed below are intended to prevent the foot link assembly from disengaging with the foot link guide track 255 in the normal direction during operation of the apparatus 100. The list is not intended to be exhaustive. Its purpose is only to illustrate a few of the many methods of restraining the foot links 205 in the normal direction.

FIGS. 10A, 10B, 10C, 10D, 10E, 10F, and 10*i* depict a method of normal retention in which one or more retaining links 605 holds a retaining member 610 underneath a feature of the foot link guide track 255, or the foot link guide track 255 itself. The interaction of the retaining member 610 with the foot link guide track 255 or a feature on the foot link guide track 255 prevents the load wheel 250 from disconnecting with the foot link guide track 255.

There are many ways to vary this method of retention, including changing the shape, size, number or other characteristic of the retaining links 605, changing the shape, size, number, or other characteristic of the retaining member 610, changing the shape, size, or number of foot link guide tracks 255, or changing the shape, size, number, or other characteristics of features connected to the foot link guide track 255 or frame 110. For example, FIGS. 10F and 10*i* depict just two kinds of the many features that could be attached to the foot link guide tracks 255 to facilitate retention. FIG. 10F depicts an eave-like structure, and FIG. 10*i* depicts a rail-like structure. A variety of other features could be employed for this purpose. Similarly, FIGS. 10A and 10D depict different shapes of the retaining member 610. FIG. 10A shows a round member and FIG. 10D shows a cylindrical member. In fact, the retaining member 610 could be any manner of bar, pin, wheel, cable, or other mechanism that could serve to prevent the load wheel 250 from disengaging with the guide track 255.

Moreover, the retaining link 605 or links can be designed to either hold the retaining member 610 at a fixed distance from the load wheel, or to allow for adjustment of that distance.

FIGS. 10C, 10D and 10E depict retaining links 605 that hold the retaining member 610 at a fixed distance. FIG. 10B depicts one embodiment of a retaining link 605 in which a preloaded spring mechanism 630 holds the retaining member 610 in contact with the guide track 255 throughout the pedal stroke. The preloaded force can be adjusted by rotating the set screws 615 and 620. This same system could also be used to establish and then adjust a gap between the retaining member 610 and the guide track 255, thereby preventing the retaining member from contacting the guide track 255 except when needed to prevent the load wheel from disengaging with the guide track 255. Such a gap can be set by rotating the set screws 615 and 620. The gap can then be adjusted over time in the same manner to compensate for wear of the load wheel 250. Again, the depictions described herein are meant to be illustrative only, and the apparatus 100 may include any number of variations and embodiments relating to retention of the load wheel 250 to the foot link guide track 255.

FIGS. 10G, 10H, 10J and 10K illustrate several embodiments of an axle bar retention system. In this system, a retention member is passed through the axle of the load wheel such that it protrudes from one or both ends of the axle. The load wheel is constrained in the normal direction by the interface of this retention member and a structure attached to the frame 110. The retention member can be any manner of pin, bolt, bar, or the like.

Figure 10G:
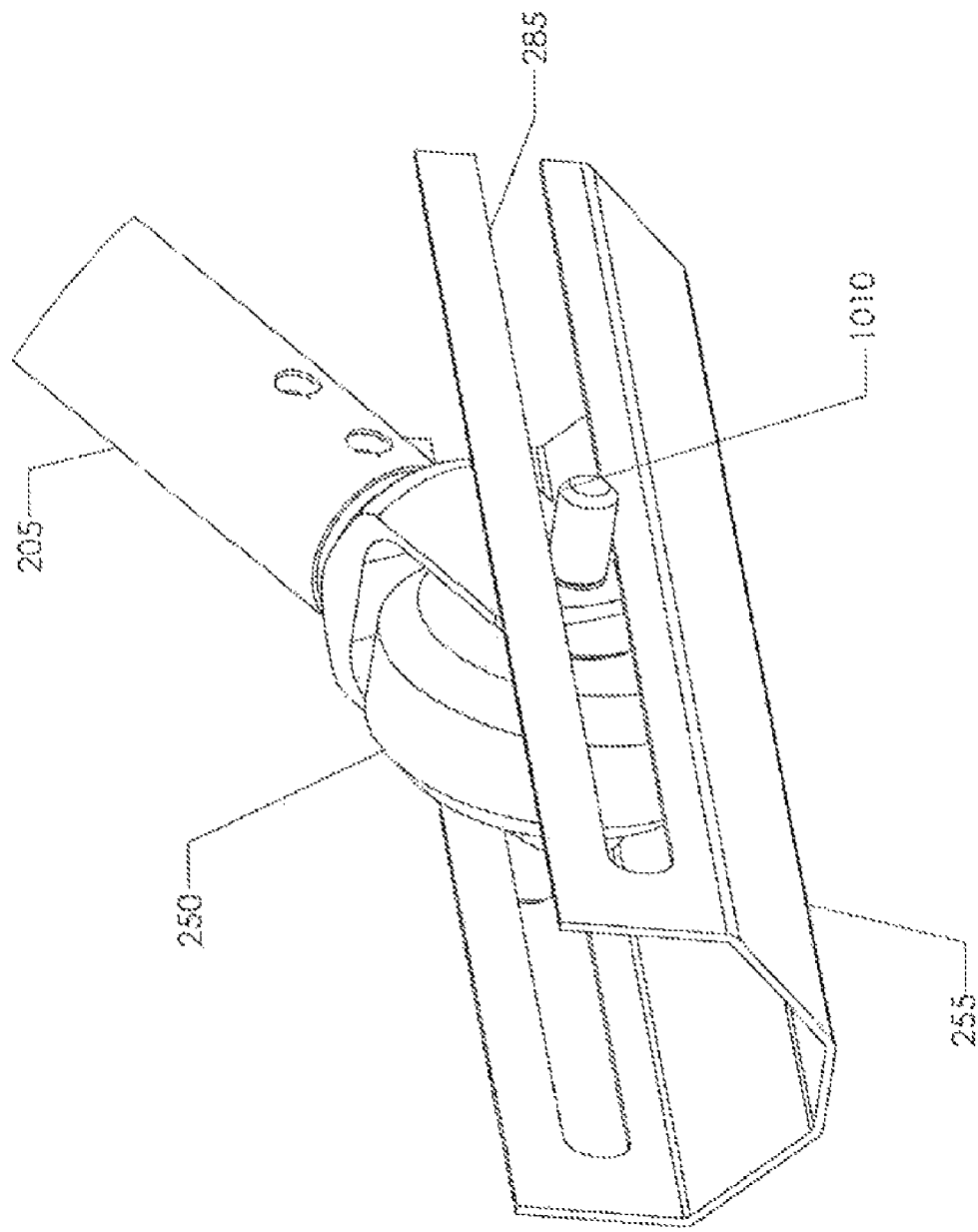

For example, as shown in FIGS. 10G and 10H, the axle retention member 1010 protrudes from both sides of the load wheel 250. In FIG. 10G, each end of the axle retention member 1010 passes through a slot 285 formed in the foot link guide track 255. The interaction between the axle retention member 1010 and the slot 285 prevents the foot link 205 from disengaging with the foot link guide track 255 in the normal direction. Similarly, in FIG. 10H, each end of the axle retention member 1010 is positioned below a ledge 280 included in the foot link guide track 255. The interaction between the axle retention member 1010 and the ledge 280 prevents the foot link 205 from disengaging with the foot link guide track 255 in the normal direction.

In FIGS. 10J and 10K, only one end of the axle retention member 1010 protrudes from the load wheel 250. In FIG. 10J, the protruding end of the axle retention member 1010 has a hole drilled through it. The hole captures a securing member 287 that is connected to the foot link guide tracks 255 or another part of the frame 110. The securing member 287 can be any manner of rod, cable, bar, or similar item. Similarly, in FIG. 10K, the axle retention member 1010 is slotted to capture a securing member 287 that is connected to the foot link guide tracks 255 or another part of the frame 110. In both embodiments, the interaction between the retention member 1010 and the securing member 287 prevents the foot link 205 from disengaging with the foot link guide track 255 in the normal direction.

Figure 10L:
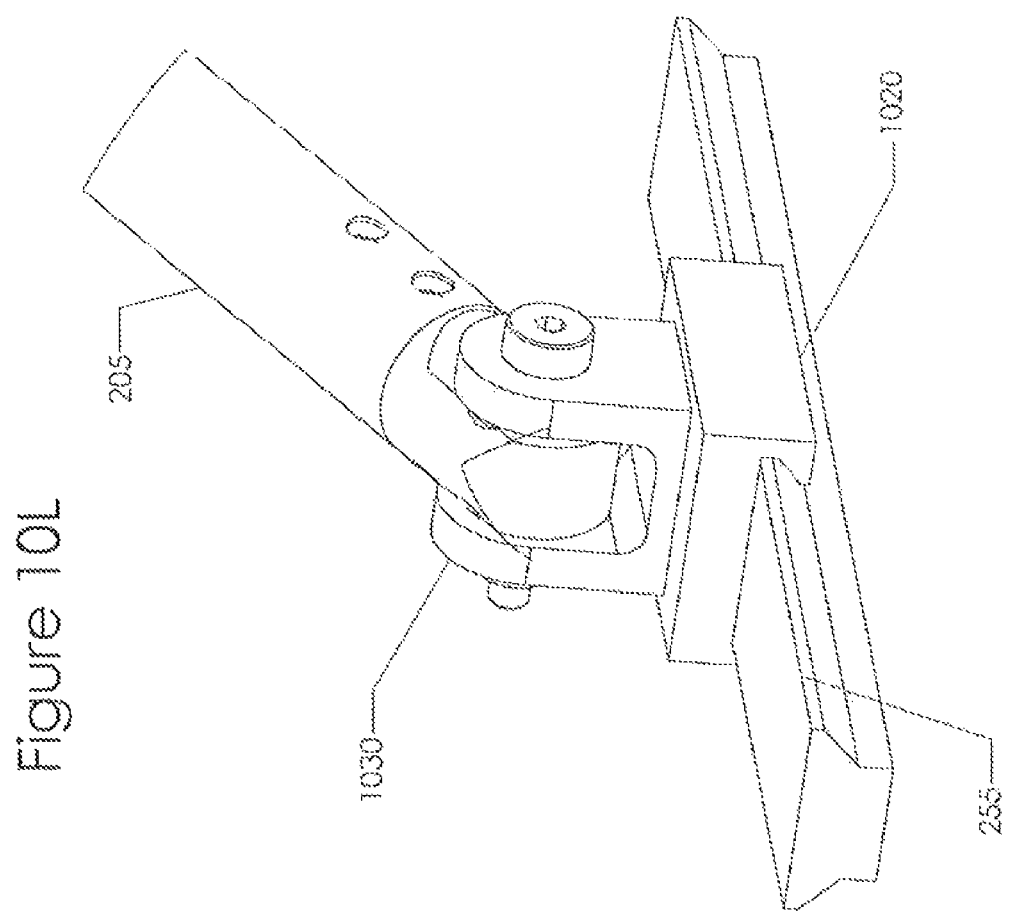

FIG. 10L depicts an alternative embodiment that provides both lateral and normal constraint. In this embodiment, the load wheel 250 has been replaced by a linear bearing 1030. The linear bearing 1030 is free to slide along the foot link guide track 255, however the lower portion 1020 of the linear bearing 1030 captures the foot link guide track 255, thereby preventing the foot link 205 from disengaging from the foot link guide track 255 in the lateral or normal direction.

Figure 9A:
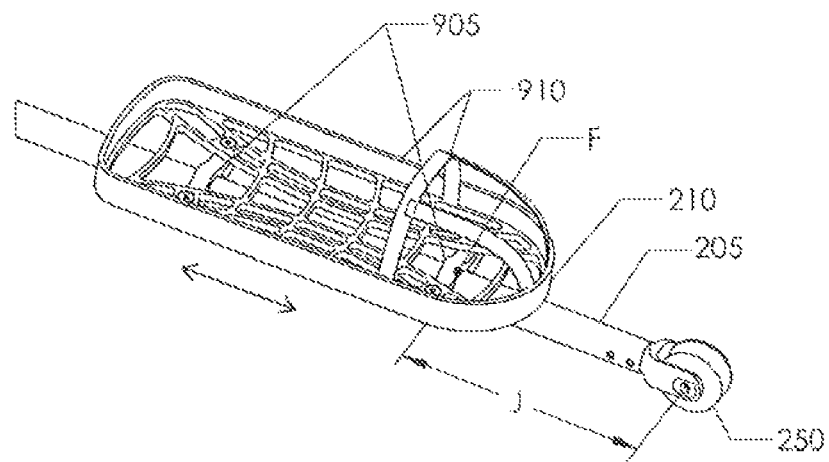
FIG. 9A shows a perspective view of one embodiment of an adjustable foot platform that may be coupled to the bicycle.
Figure 9B:
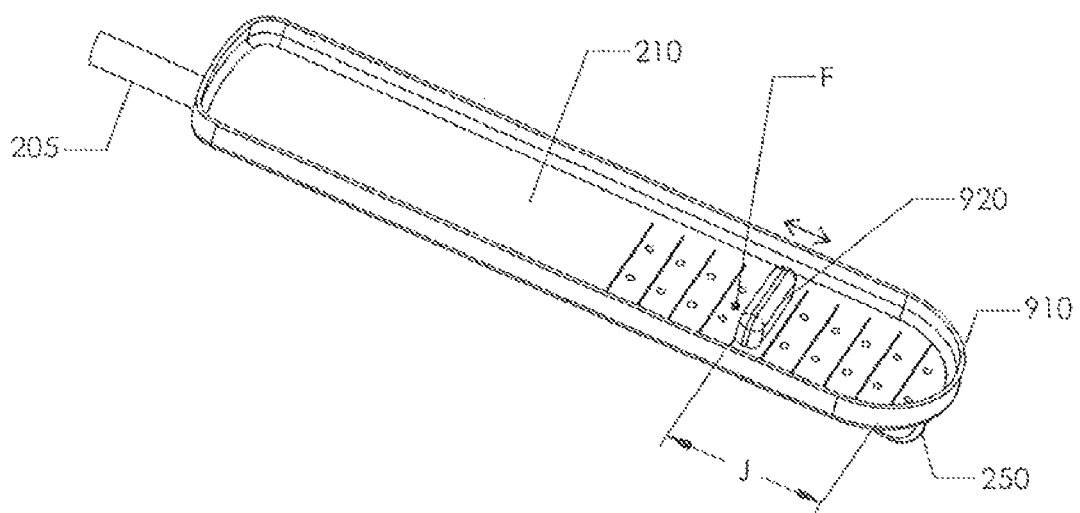
FIG. 9B shows a perspective view of another embodiment of an adjustable foot platform that may be coupled to the bicycle.

As discussed above, there are several ways to modify the elliptical pedaling profile of the apparatus 100. One method is to change the location of the ball of the operator's foot (identified as location F in FIGS. 2, and 9A-B) with respect to the load wheel 250 or the first end of each foot link 205. Referring now to FIGS. 9A-B, the first end of the foot link 205 is the end of the foot link 205 that is directly adjacent to the load wheel 250, and the second end of the foot link 205 is the end of the foot link 205 that is directly adjacent to the foot link bearing 220 (shown in FIG. 1). Modifying the location of the operator's foot 121 relative to the load wheel 250 or the first end of the foot link 205 changes the operator foot offset (identified as distance J in FIGS. 2 and 9A-B). To achieve a flatter and more eccentric pedaling profile, the operator can position his or her foot closer to the first end of each foot link 205. Alternatively, by positioning his or her foot further away from the first end of the foot link 205, the operator can create a more circular and less eccentric pedaling profile. Because the distance between the operator's foot 121 and the load wheel 250 or first end of each foot link 205 influences the pedaling profile, the repeatability of adjustments to this distance ensures that the operator can experience the desired pedaling profile.

There are a variety of ways to enable the operator to repeatably modify the position of his or her foot relative to the first end of the foot link 205. FIG. 9A depicts one method. In this embodiment, each foot platform designates a single position for an operator's foot 121. The interface between each foot platform 210 and its respective foot link 205 is adjustable such that the foot platforms 210 can be attached onto the foot links 205 at different distances from the first ends of the foot links 205. The attachment method in this embodiment is a pair of releasable clamps 905 that connect each foot platform 210 to its respective foot link 205. This mechanism enables the operator to adjust each foot platform to achieve a repeatable placement of his or her foot relative to the first end of each foot link. In addition, each foot platform 210 could also include one or more securing elements 910 such as ridges or straps to prevent the operator's foot 121 from unintentionally disengaging from the foot platform 210. It will be appreciated that the securing elements 910 can take many equivalent forms, such as baskets, clips, bumps, cleats, or the like. In addition, index lines (not shown) could be incorporated into the foot link 205 to facilitate more accurate and repeatable positioning of the foot platforms 210 relative to the first end of the foot link 205.

There are additional ways to create a repeatable adjustable interface between the foot platforms 210 and foot links 205. For example, a repeatable interface could also be created by a series of mounting holes in the foot links 205 and/or the foot platforms 210 that allow for different mounting positions of the foot platform 210 along the foot link 205.

FIG. 9B depicts an alternative method for enabling the operator to repeatably change the position of his or her foot relative to the first end of each foot link 205. In this embodiment, the foot platform 210 is large enough to permit the operator to change the position of his or her foot relative to the first end of the foot link 205 without moving the foot platform 210. The foot platform 210 includes one or more foot locators 920 to enable the repeatable use of the various foot positions on the foot platform 210. The foot locators 920 could include features such as cleats, bumps, ridges, or the like. Each foot platform 210 could also include securing elements 910 as discussed in connection with FIG. 9A.

Figure 8:
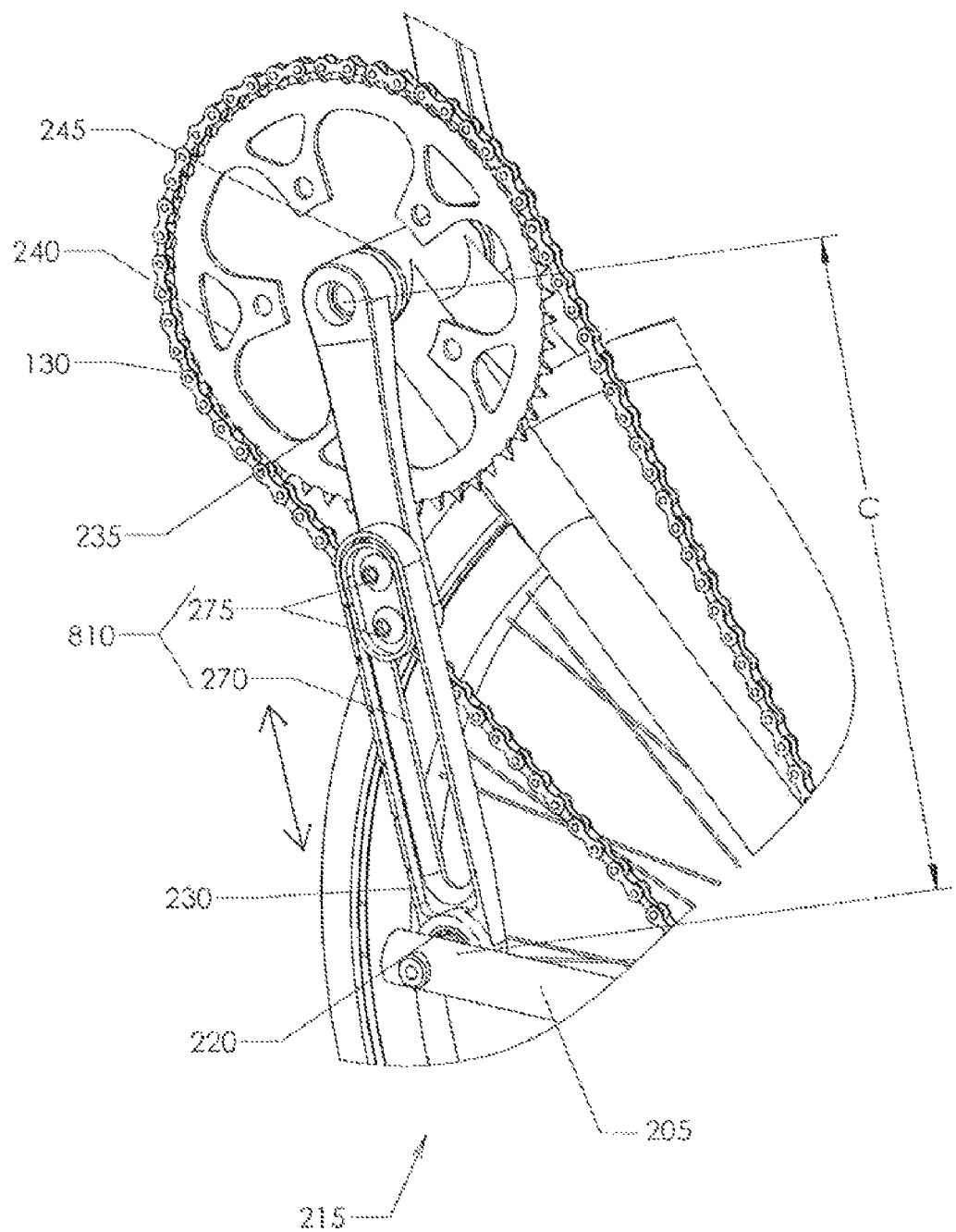
FIG. 8 shows a close-up perspective view of adjustable crank arms that may be coupled to the bicycle.

As discussed above, another method for adjusting the pedaling profile is modifying the length of the crank arms 235. As shown in FIGS. 1 and 8, the crank assembly 215 includes a crank extender 230 rotatably connected to the second end of the foot link 205 at the foot link bearing 220. The crank assembly 215 also includes a crank drive arm 235 rotatably connected at the crank arm bearing 245 to a drive sprocket 240. As shown in FIG. 2, Circle R, shown as a dashed line, is generated by rotating the crank assembly 215 around the crank arm bearing 245. The distance between the center of the crank arm bearing 245 and the center of the foot link bearing 220 is crank arm length C. Shortening crank arm length C will shorten the stride length A. Correspondingly, increasing crank arm length C will increase stride length A. Therefore, adjustments in crank arm length C can be made to modify stride length A to allow operators of different stature to adjust the apparatus 100 to suit their individual dimensions.

There are many ways to modify the length of the crank arms 235. FIG. 8 depicts one method for making the crank assembly 215 adjustable. This method employs a slot-bolt assembly 810 where the crank extender 230 includes a slot 270 and the crank drive arm 235 includes apertures configured to receive crank fasteners 275 that can locate the crank drive arm 235 at any position along slot 270. The crank extender 230 can thereby telescope, or adjust its length with respect to the crank drive arm 235.

There are additional ways to make the crank assembly 215 adjustable. For example, the slot-bolt assembly 810 discussed above can be replaced by a clamp with pins that can clamp the crank extender 230 to the crank drive arm 235 at various positions. Another embodiment may make the crank assembly 215 adjustable by incorporating a series of holes in the crank extender 230 or the crank drive arm 235, or both. In such an embodiment, the length of the crank drive 235 arms may be modified by changing which holes are used to fasten the crank extender 230 to the crank drive arm 235.

As discussed above, and again with reference to FIG. 2, crank arm length C is a significant factor that determines major axis length A, which approximately equals the stride length of a given pedaling profile. For a rider of average height and body dimensions, as the stride length shrinks below approximately 17 inches, the rider's ability to transfer power to the apparatus 100 for purposes of acceleration and climbing becomes reduced. As a result, while embodiments with stride lengths generally less than about 17 inches may be appropriate for a small percentage of operators, the vast majority of riders will desire stride lengths longer than 17 inches to achieve sufficient pedaling efficiency. Embodiments of the apparatus 100 presented herein can accommodate stride lengths in excess of 23 inches.

As the stride length increases, it may be desirable to increase the wheelbase W as shown in FIG. 2. For a low cross-over height frame 110, the longer the wheelbase W, the more difficult it is to maintain an appropriate level of bending stiffness, yet a wheelbase W that is significantly longer than conventional bicycles is desirable. For example, a conventional bicycle may have a wheelbase of about 40 inches, but embodiments of the present invention may have a wheelbase W that may range from about 55 inches to about 65 inches. As discussed above, embodiments of the apparatus 100 include a frame 110 having a sufficient bending stiffness to accommodate a stride length beyond 23 inches.

Alternative embodiments of the apparatus 100 can incorporate additional features, such as a direct drive propulsion mechanism, adjustable guide tracks, and/or foldability. FIG. 12 depicts an embodiment of the apparatus that employs a direct drive propulsion system. In this embodiment, the crank arms 235 are connected directly to the hub 1210 by means of bearings (not shown) mounted in the frame 110, through which passes a linkage from each crank arm 235 to the hub 1210. This alternative embodiment alleviates the need for a chain and sprockets. This embodiment could incorporate a gearing system in the crank-to-hub-wheel linkage that could allow the rear wheel to rotate more quickly than the crank arms. Such a gearing system could provide a fixed input-output ratio, or could allow for one of a series of gears to be selected by the operator. In addition, the rear wheel 117 could be enlarged to allow the operator to achieve a greater rate of speed for each completed pedal stroke.

Figure 7:
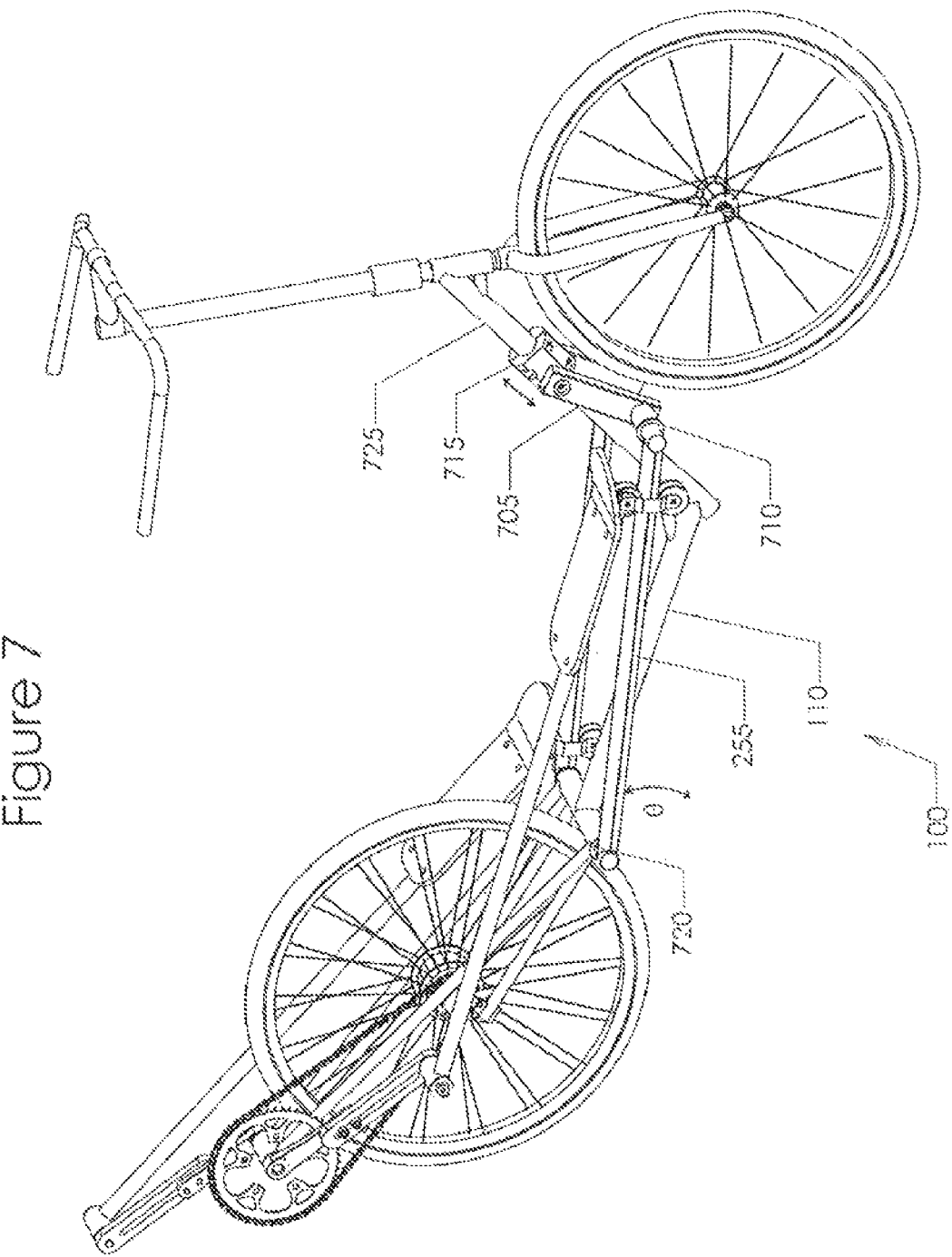
FIG. 7 shows a perspective view of yet another embodiment of the bicycle that includes an adjustable guide track.

FIG. 7 depicts a low cross-over height frame 110 with adjustable foot link guide tracks 255. The forward end of each foot link guide track 255 is attached to a foot link guide track support 705 by the use of a rotary bearing 710, so that the forward end of the foot link guide track 255 can rotate about the foot link guide track support 705. Each foot link guide track support 705 is attached to its respective side of a collar 715 by the use of a bolt and low friction washers, or other suitable means. The collar 715 can be clamped to the downtube 725 at various locations by means of bolts or other fasteners. The low friction washers allow each foot link guide track support 705 to rotate about the bolt. The rearward or second end of each foot link guide track 255 is attached to the frame by the use of a rotary bearing 720. Unclamping the collar 715 allows the operator to slide the collar 715 along the downtube 725, thereby adjusting the angle of the foot link guide tracks 255. As discussed below, changing the angle of the foot link guide tracks 255 modifies the elliptical pedaling profile experienced by the operator.

FIGS. 13A and 13B depict an embodiment of the apparatus 100 that can be folded to facilitate transport or storage in small spaces. In this embodiment of a foldable apparatus 100, the apparatus 100 is folded according to following procedure. First, the foot link retainer 610 on each foot link assembly 105 is released from the guide track 255 by removing a pin (not shown). Next, each foot link assembly 105 is rotated about its respective foot link bearing 220 towards the rear wheel 117 approximately one hundred eighty (180) degrees. Next, the coupling 1340 on each side of the apparatus is released. Each foot link guide track 255 is then rotated downwards about guide track pivot 1330. Next, the crank assembly 215 is rotated forward about pivot 1320 until the rear wheel 117 passes through the frame 110. Next, each guide track 255 is rotated upwards about guide track pivot 1330. Then the crank assembly 215 is rotated until the right crank arm 235 points to the rear, as depicted in FIG. 13B. At that point, each foot link 205 may be strapped to the adjacent crank arm extender 230. The right foot link assembly 105 is then positioned on top of the front fork 127 and the left foot link assembly 105 is positioned on top of the axle of the rear wheel 117. Next, the steering assembly pivot 1310 is released and the steering extender sleeve 126 is rotated rearward. The steering extender sleeve 126 is then locked in place at steering assembly pivot 1310 as depicted in FIG. 13B. Once locked, the steering extender sleeve 126 may be used as a handle to carry or help direct the path of travel for the folded apparatus 100. FIG. 13B depicts the results of following the folding procedure described above.

In addition, the apparatus 100 can include gearing. Gearing can be implemented through techniques known in the art, including a series of different sized sprockets attached to the rear wheel 117 and selected by a derailleur, or a single rear sprocket connected to a hub that contains a series of gears inside of it which enable the hub to produce a variety of input-to-output ratios. This embodiment could incorporate techniques known in the art to permit the operator to select gears. This could include mounting a shift lever on the steering mechanism 120 as is known in the art. The apparatus 100 can also include a fixed gear system with no freewheel on the rear wheel 117.

The apparatus can also include mechanisms to retard motion, such as rim or disc braking systems known in the art. These mechanisms can be located on the front and/or rear wheels. The braking mechanisms can be actuated by, for example, a hinged handle or other structure mounted on the handlebars to which the brake cables or some other mechanism are connected, as is known in the art. In addition, the apparatus can include other attributes that are commonly incorporated onto other human powered vehicles, such as reflectors, lights, bottle cages, etc.

It is to be noticed that the term "comprising", used in the claims, should not be interpreted as being limitative to the means listed thereafter. Thus, the scope of the expression "a device comprising means A and B" should not be limited to devices consisting only of components A and B. It means that with respect to the present invention, the only relevant components of the device are A and B. Moreover, the components A and B should not be limited to a specific relationship or form; instead, they can be integrated together into a single structure or can operate independently.

Similarly, it is to be noticed that the term "coupled", also used in the claims, should not be interpreted as being limitative to direct connections only. Thus, the scope of the expression "a device A coupled to a device B" should not be limited to devices or systems wherein device A is directly connected to device B. It means that there exists a path between A and B which may be a path including other devices or means. In addition, "coupled" does not necessarily mean "in a fixed position or relationship" as "coupled" may include a moveable, rotatable or other type of connection that allows relative movement between A and B. Finally, "coupled" may also include "integral" where device A and device B are fabricated as an integral component or single structure.

Thus, it is seen that a bicycle is provided. One skilled in the art will appreciate that the bicycle of the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the bicycle has been described in conjunction with specific embodiments, it is evident that many alternatives, modifications, permutations and variations will become apparent to those of ordinary skill in the art in light of the foregoing description. Accordingly, it is intended that the bicycle embrace all such alternatives, modifications and variations as fall within the scope of the appended claims.

What is claimed is:

1. An apparatus, comprising:
   a frame;
   a drive wheel coupled to the frame;
   a first and a second foot link, operably coupled to drive wheel to transfer power to said drive wheel so as to propel the apparatus, each including a foot receiving portion for receiving an operator's foot, a front end, and a rear end;
   a first and a second foot link guide track, each foot link guide track operatively associated with the front end of its respective foot link to direct the front end along a reciprocating path of travel while providing retention to the foot link,
   wherein the front end of each foot link comprises a foot link guide track coupler and said foot link guide track coupler is internally disposed relative to each foot link guide track and the first and the second foot link guide tracks include an open top that the front ends of the foot links extend through.

2. The apparatus of claim 1, where the foot link guide track includes a cavity that the front end of the foot link is disposed within.

3. The apparatus of claim 2, where the foot link guide track coupler comprises a wheel assembly.

4. The apparatus of claim 3, wherein the foot link guide track includes a retention mechanism to retain the wheel assembly in the cavity of the foot link guide track.

5. The apparatus of claim 4, wherein the retention mechanism includes a ledge to retain the wheel assembly in the cavity of the foot link guide track.

6. An apparatus, comprising:
a frame;
a drive wheel coupled to the frame;
a first and a second foot link, operably coupled to drive wheel to transfer power to said drive wheel so as to propel the apparatus, each including a foot receiving portion for receiving an operator's foot, a front end, and a rear end;
a first and a second foot link guide track, each foot link guide track operatively associated with the front end of its respective foot link to direct the front end along a reciprocating path of travel while providing retention to the foot link,
wherein the front end of each foot link comprises a foot link guide track coupler and said foot link guide track coupler is externally disposed relative to each foot link guide track, and further includes a vertical upward retention mechanism that retains the front end of each foot link from moving vertically upward relative to the foot link guide track.

7. The apparatus of claim 6, where a portion of the foot link guide track is substantially "V" shaped, and the foot link guide track coupler assembly includes a wheel assembly having a substantially similar "V" shape for rotatably mating thereto.

8. The apparatus of claim 6, where a portion of the foot link guide track has a substantially convex surface, and the foot link guide track coupler includes a wheel assembly having a substantially concave surface for rotatably mating thereto.

9. The apparatus of claim 6, where the foot link guide track coupler includes a wheel assembly and a retention mechanism that inhibits the wheel assembly from departing the foot link guide track by contacting a surface coupled to the frame.

10. The apparatus of claim 6, where a portion of each foot link guide track has a substantially concave surface, and the foot link guide track coupler includes a wheel assembly having a substantially convex surface for rotatably mating thereto.

11. The apparatus of claim 6, where the foot link guide track coupler includes at least one retention member structured to substantially engage a surface coupled to the frame.

12. The apparatus of claim 11, where the foot link guide track coupler includes a retention link coupled to the at least one retention member, and the retention link is adjustable to vary a position of the retention member relative to the surface coupled to the frame.

13. The apparatus of claim 11, where each foot link guide track coupler includes a preloaded retention link coupled to the at least one retention member, where the preloaded retention link locates the retention member substantially in contact with the surface coupled to the frame.

14. The apparatus of claim 1, where the front end of each foot link comprises a foot link guide track coupler, and each foot link guide track coupler includes a linear bearing that slides along each foot link guide track.

15. An apparatus, comprising:
a frame having a drive wheel rotatably supported thereupon, and a first pivot axis defined thereupon;
a first and a second foot link, each having a first end, a second end, and a foot receiving portion defined thereupon;
a coupler assembly which is in mechanical communication with said pivot axis and with the first end of each of said first and second foot links, said coupler assembly being operative to direct said first ends of said foot links in an arcuate path of travel;
a foot link guide track supported by said frame, said foot link guide track being operable to engage the second end of each of said foot links, and to direct said second ends along a reciprocating path of travel while providing for a means of retaining each foot link onto its respective foot link guide track;
a power transfer linkage in mechanical communication with said coupler assembly and with said drive wheel; whereby when the first end of one of said foot links travels in said arcuate path and the second end of that foot link travels in said reciprocal path, an operator's foot supported thereupon travels in a generally elliptical path of travel, and said power transfer linkage transfers power from said coupler assembly to said drive wheel, so as to supply propulsive power thereto,
wherein the front end of each foot link comprises a foot link guide track coupler and said foot link guide track coupler is internally disposed relative to each foot link guide track and the first and the second foot link guide tracks include an open top that the front ends of the foot links extend through.

16. The apparatus of claim 15, where the foot link guide track includes a cavity that the front end of the foot link is disposed within.

17. The apparatus of claim 16, where the foot link guide track coupler comprises a wheel assembly.

18. The apparatus of claim 17, wherein the foot link guide track includes a retention mechanism to retain the wheel assembly in the cavity of the foot link guide track.

19. The apparatus of claim 18, wherein the retention mechanism includes a ledge to retain the wheel assembly in the cavity of the foot link guide track.

20. An apparatus, comprising:
a frame having a drive wheel rotatably supported thereupon, and a first pivot axis defined thereupon;
a first and a second foot link, each having a first end, a second end, and a foot receiving portion defined thereupon;
a coupler assembly which is in mechanical communication with said pivot axis and with the first end of each of said first and second foot links, said coupler assembly being operative to direct said first ends of said foot links in an arcuate path of travel;
a foot link guide track supported by said frame, said foot link guide track being operable to engage the second end of each of said foot links, and to direct said second ends along a reciprocating path of travel while providing for a means of retaining each foot link onto its respective foot link guide track;
a power transfer linkage in mechanical communication with said coupler assembly and with said drive wheel; whereby when the first end of one of said foot links travels in said arcuate path and the second end of that foot link travels in said reciprocal path, an operator's foot supported thereupon travels in a generally elliptical path of travel, and said power transfer linkage transfers power from said coupler assembly to said drive wheel, so as to supply propulsive power thereto, wherein the front end of each foot link comprises a foot link guide track coupler and said foot link guide track coupler is externally disposed relative to each foot link guide track, and further including a vertical upward retention mechanism that retains the front end of each foot link from moving vertically upward relative to the foot link guide track.

21. The apparatus of claim 20, where a portion of the foot link guide track is substantially "V" shaped, and the foot link guide track coupler assembly includes a wheel assembly having a substantially similar "V" shape for rotatably mating thereto.

22. The apparatus of claim 20, where a portion of the foot link guide track has a substantially convex surface, and the foot link guide track coupler includes a wheel assembly having a substantially concave surface for rotatably mating thereto.

23. The apparatus of claim 20, where the foot link guide track coupler includes a wheel assembly and a retention mechanism that inhibits the wheel assembly from departing the foot link guide track by contacting a surface coupled to the frame.

24. The apparatus of claim 20, where a portion of each foot link guide track has a substantially concave surface, and the foot link guide track coupler includes a wheel assembly having a substantially convex surface for rotatably mating thereto.

25. The apparatus of claim 20, where the foot link guide track coupler includes at least one retention member structured to substantially engage a surface coupled to the frame.

26. The apparatus of claim 25, where the foot link guide track coupler includes a retention link coupled to the at least one retention member, and the retention link is adjustable to vary a position of the retention member relative to the surface coupled to the frame.

27. The apparatus of claim 25, where each foot link guide track coupler includes a preloaded retention link coupled to the at least one retention member, where the preloaded retention link locates the retention member substantially in contact with the surface coupled to the frame.

28. The apparatus of claim 15, where the front end of each foot link comprises a foot link guide track coupler, and each foot link guide track coupler includes a linear bearing that slides along each foot link guide track.

29. The apparatus of claim 6, where the front end of each foot link comprises a foot link guide track coupler, and each foot link guide track coupler includes a linear bearing that slides along each foot link guide track.

30. The apparatus of claim 20, where the front end of each foot link comprises a foot link guide track coupler, and each foot link guide track coupler includes a linear bearing that slides along each foot link guide track.

* * * * *